(12) United States Patent
Suzuki

(10) Patent No.: US 11,108,984 B2
(45) Date of Patent: Aug. 31, 2021

(54) IMAGE PROCESSING DEVICE AND CONTROL METHOD THEREFOR, AND STORAGE MEDIUM

(71) Applicant: CANON KABUSHIKI KAISHA, Tokyo (JP)

(72) Inventor: Soichiro Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/005,541

(22) Filed: Aug. 28, 2020

(65) Prior Publication Data

US 2020/0396407 A1 Dec. 17, 2020

Related U.S. Application Data

(63) Continuation of application No. PCT/JP2018/048504, filed on Dec. 28, 2018.

(30) Foreign Application Priority Data

Mar. 1, 2018 (JP) .............................. JP2018-036738

(51) Int. Cl.
*H04N 5/378* (2011.01)
*H04N 5/369* (2011.01)
*H04N 5/347* (2011.01)

(52) U.S. Cl.
CPC ............. *H04N 5/378* (2013.01); *H04N 5/347* (2013.01); *H04N 5/379* (2018.08)

(58) Field of Classification Search
CPC ........ H04N 5/378; H04N 5/379; H04N 5/347; H04N 5/36961; H04N 5/343; H04N 5/23245; H04N 5/23227; G06F 12/00; G06F 13/38; G06F 13/42
USPC ........................................................ 348/308
See application file for complete search history.

(56) References Cited

U.S. PATENT DOCUMENTS

| | | | |
|---|---|---|---|
| 7,199,829 B2 * | 4/2007 | Matsui ............. | H04N 5/232939 348/333.02 |
| 7,787,026 B1 * | 8/2010 | Flory ..................... | H04N 5/232 348/231.99 |
| 8,054,341 B2 * | 11/2011 | Kang ................. | H04N 5/23245 348/231.99 |

(Continued)

FOREIGN PATENT DOCUMENTS

| JP | 2006-203437 A | 8/2006 |
|---|---|---|
| JP | 2010-004281 A | 1/2010 |

(Continued)

*Primary Examiner* — Pritham D Prabhakher
(74) *Attorney, Agent, or Firm* — Cowan, Liebowitz & Latman, P.C.

(57) ABSTRACT

An image processing device includes a buffer memory configured to temporarily store image data, setting circuit for setting a first data rate at which the image data is transferred to a recording memory, and adjusting circuit for adjusting a data rate by causing a portion of image data read from the image sensor to be temporarily stored in the buffer memory when a second data rate exceeds the first data rate, and causing the temporarily stored portion of the image data to be output from the buffer memory when the second data rate is lower than the first data rate, the portion of the image data corresponding to an amount by which the second data rate exceeds the first data rate.

15 Claims, 22 Drawing Sheets

(56) References Cited

U.S. PATENT DOCUMENTS

| | | | |
|---|---|---|---|
| 8,854,488 B2* | 10/2014 | Shiomi | H04N 5/335 |
| | | | 348/222.1 |
| 9,282,240 B2* | 3/2016 | Arakawa | H04N 5/347 |
| 9,930,303 B1* | 3/2018 | Morgan | H04N 9/3179 |
| 10,346,323 B2* | 7/2019 | Tanaka | G06F 13/38 |
| 10,382,832 B2* | 8/2019 | Fujii | H04N 21/47217 |
| 10,452,583 B2* | 10/2019 | Tanaka | G06F 13/4282 |
| 2004/0196381 A1* | 10/2004 | Matsuzaka | H04N 9/04557 |
| | | | 348/222.1 |
| 2010/0214441 A1* | 8/2010 | Yanada | H04N 9/8042 |
| | | | 348/231.2 |
| 2013/0147990 A1* | 6/2013 | Shintani | H04N 21/4334 |
| | | | 348/231.99 |
| 2015/0103206 A1* | 4/2015 | Arakawa | H04N 5/232 |
| | | | 348/231.99 |

FOREIGN PATENT DOCUMENTS

| | | |
|---|---|---|
| JP | 2010-199880 A | 9/2010 |
| JP | 2015-097372 A | 5/2015 |

* cited by examiner

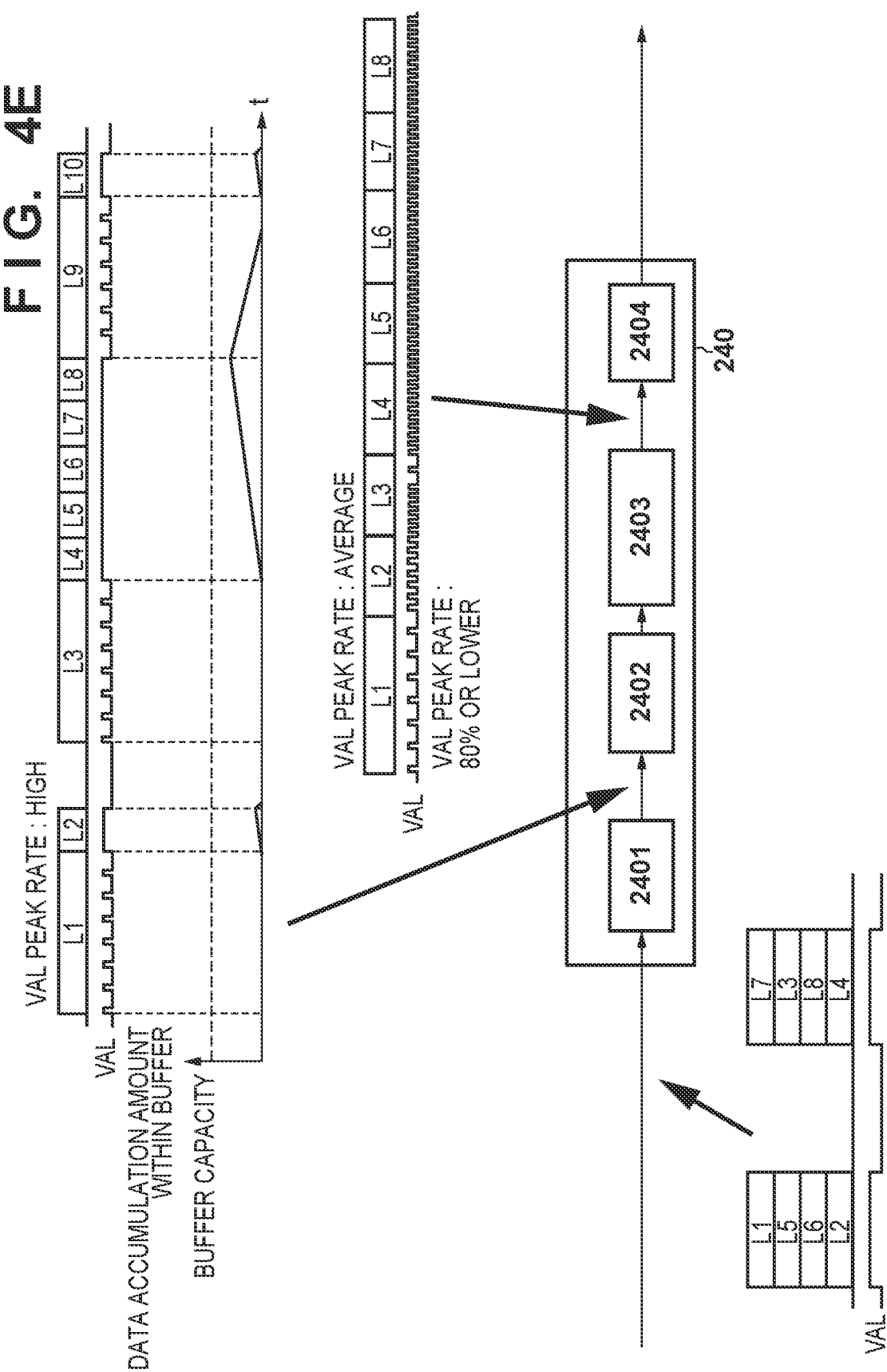

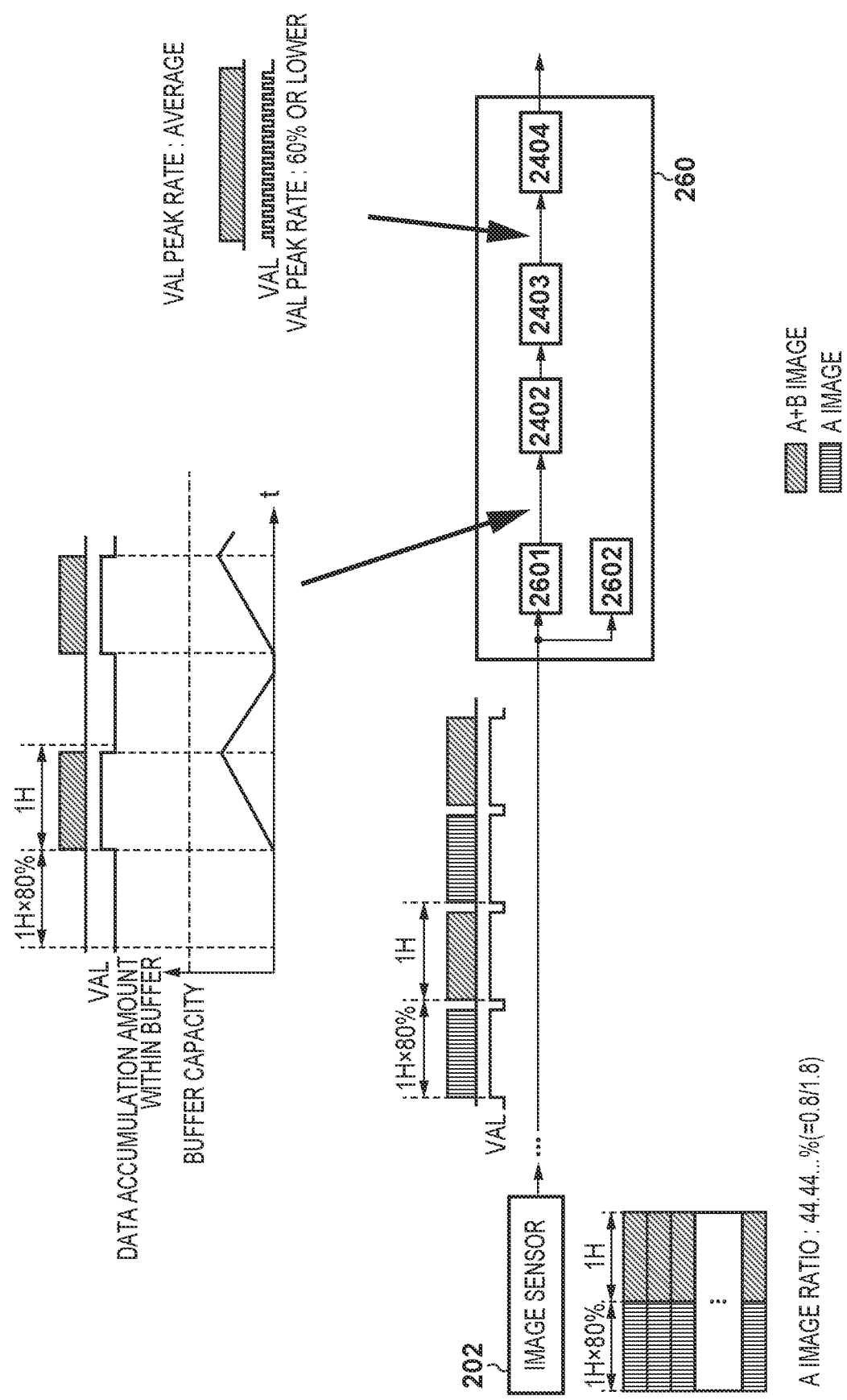

IMAGE PROCESSING DEVICE AND CONTROL METHOD THEREFOR, AND STORAGE MEDIUM

CROSS-REFERENCE TO RELATED APPLICATIONS

This application is a Continuation of International Patent Application No. PCT/JP2018/048504, filed Dec. 28, 2018, which claims the benefit of Japanese Patent Application No. 2018-36738, filed Mar. 1, 2018, both of which are hereby incorporated by reference herein in their entirety.

BACKGROUND OF THE INVENTION

Field of the Invention

The present invention relates to an image processing device that writes captured image data into a memory and performs image processing.

Background Art

Recent years have seen significant improvement of image capturing devices such as digital cameras in terms of the number of pixels, still image continuous shooting frame speed, and moving image frame rate, and the volume of data processed per unit time is increasing. Image capturing devices such as digital cameras commonly write data captured using an image sensor into a memory such as a DRAM, read out written data, perform image processing on the data, and record the data subjected to the image processing in a medium or the like. Here, if a memory bus bandwidth is taken up as a result of an increase in the volume of data processed per unit time, the data processing rate of image processing is reduced, and the still image continuous shooting frame speed and the moving image frame rate performance are reduced.

To deal with this problem, it is possible to consider increasing processing frequencies of the memory bus or a data width to increase the bandwidth, but in such a case, cost and power consumption of an image processing device included in a digital camera or the like are increased. As described above, it is more and more important for image capturing devices such as digital cameras in recent years to process data at a higher speed without taking up the memory bus bandwidth.

To deal with the above-described problem, various technologies have been proposed for processing data at a higher speed without taking up the memory bus bandwidth.

In PTL1, when captured image data is written into a memory or read from the memory, the captured image data is compressed or decompressed to process data at a high speed without taking up the memory bus bandwidth. In PTL2, if a captured image data rate is high, captured image data is processed after it is reduced, to process data at a high speed without taking up the memory bus bandwidth.

CITATION LIST

Patent Literature

PTL1: Japanese Patent Laid-Open No. 2010-4281
PTL2: Japanese Patent Laid-Open No. 2015-97372

However, in the above-described conventional technologies, captured image data is compressed or reduced and the amount of information regarding the captured image data is reduced to achieve a data rate at which the data can be processed, and accordingly, the quality of a recorded image may be degraded.

The present invention was made in view of the above-described problems, and provides an image processing device that can process data at a high speed without degrading image quality in a case in which a captured image data rate is high.

SUMMARY OF THE INVENTION

According to the present invention, there is provided an image processing device comprising: a buffer memory configured to temporarily store image data that is read from an image sensor at a data rate whose density varies; a setting circuit configured to set a first data rate at which the image data is transferred to a recording memory for recording the image data, according to variation in the density of the data rate; and an adjusting circuit configured to adjust a data rate by causing a portion of image data read from the image sensor to be temporarily stored in the buffer memory when a second data rate exceeds the first data rate, and causing the temporarily stored portion of the image data to be output from the buffer memory when the second data rate is lower than the first data rate, the second data rate being a data rate at which the image data is read from the image sensor, the portion of the image data corresponding to an amount by which the second data rate exceeds the first data rate.

Further features of the present invention will become apparent from the following description of exemplary embodiments with reference to the attached drawings.

BRIEF DESCRIPTION OF THE DRAWINGS

The accompanying drawings are included in the description, constitute a part of the description, illustrate embodiments of the present invention, and are used for explaining the principle of the present invention in conjunction with the description of the embodiments.

FIG. 4E is a diagram showing a variation of data rate adjustment according to the number of simultaneously read rows in the first embodiment.

FIG. 12A is a diagram showing data rate adjustment in the third embodiment.

DESCRIPTION OF THE EMBODIMENTS

The following describes embodiments of the present invention in detail with reference to the accompanying drawings.

First Embodiment

Figure 1:
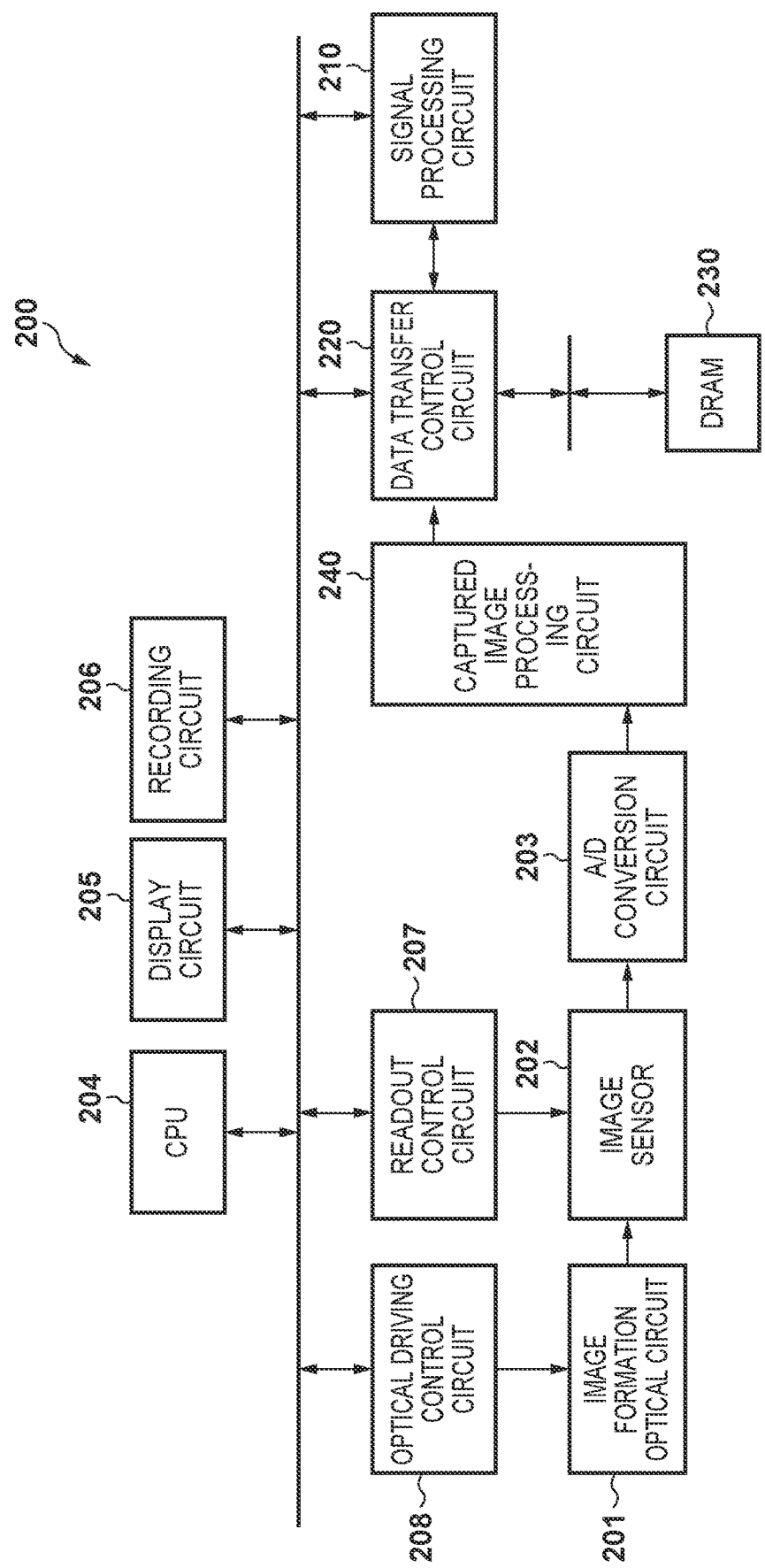
FIG. 1 is a block diagram showing a configuration of an image capturing device that is a first embodiment of an image processing device according to the present invention.

FIG. 1 is a block diagram showing a configuration of an image capturing device 200, which is a first embodiment of an image processing device according to the present invention.

In FIG. 1, an image formation optical unit 201 is constituted by a lens, a diaphragm, and the like and forms an image of a subject. An optical driving control circuit 208 controls operations for focus adjustment and exposure adjustment. An image sensor 202 is an image sensor such as a CCD that converts an optical image to an electrical signal. A readout control circuit 207 controls reading of signals from the image sensor 202 and can perform simultaneous reading from a plurality of rows in a single plane of the image sensor 202. Variations of multiple-row simultaneous reading in the present embodiment will be described later using FIGS. 4A to 4E.

An A/D conversion circuit 203 converts an analogue image signal output from the image sensor 202 to digital image data. A captured image processing circuit 240 controls a data rate of image data and performs correction processing such as sensor flaw correction on image data. A data transfer control circuit 220 controls writing of image data into a DRAM (recording memory) 230 and reading of image data from the DRAM 230. A signal processing circuit 210 performs various kinds of image processing, such as noise reduction processing, on image data. A CPU 204 is constituted by a microcomputer and performs various kinds of control on the entire image capturing device 200 via a bus by executing programs stored in a non-volatile memory (not shown). Also, the CPU 204 controls storing of data into a buffer memory 2402, which will be described later, and outputting of data from the buffer memory 2402. A display 205 is constituted by a liquid crystal monitor or the like and displays image data obtained through signal processing. A recording circuit 206 records image data obtained through signal processing in a recording medium.

Figure 2:
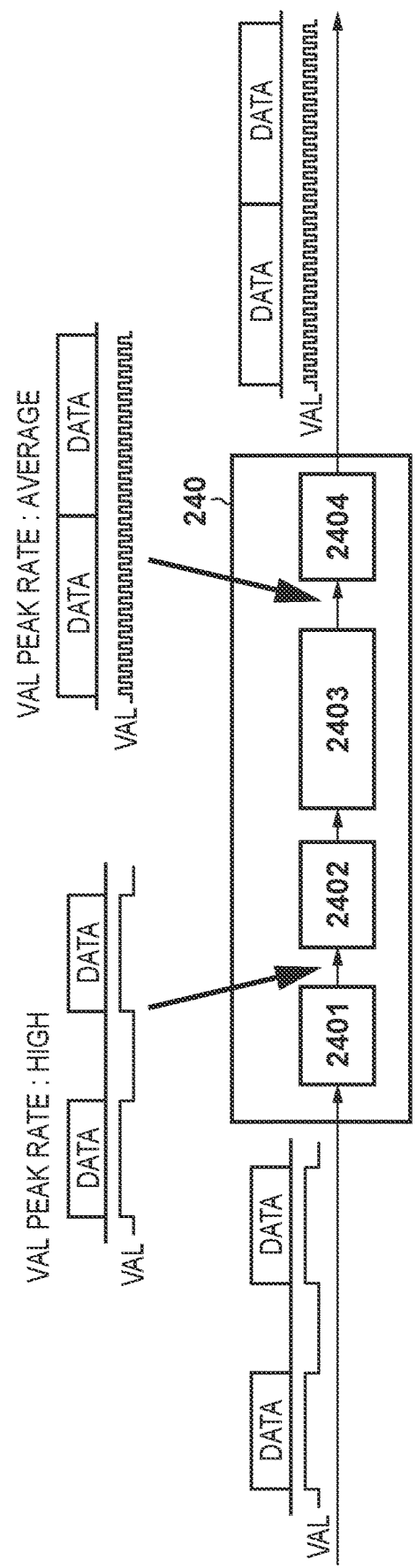
FIG. 2 is a block diagram showing a configuration of a captured image processing circuit in the first embodiment.

FIG. 2 is a block diagram showing a configuration of the captured image processing circuit 240.

In FIG. 2, a row rearrangement circuit 2401 rearranges a plurality of rows for which simultaneous reading has been performed, on row-by-row basis. A signal (hereinafter denoted with "VAL") that indicates valid data of input/output data of the row rearrangement circuit 2401 includes sparse periods and dense periods, and input data includes valid periods during which valid data is input and invalid data periods (blanking) during which valid data is not input. Rearrangement methods in the present embodiment will be described later using FIGS. 4A to 4E.

Data can be accumulated in the buffer 2402, and the buffer memory 2402 absorbs a local difference between an input data rate and an output data rate. A data rate adjusting circuit 2403 controls the output data rate so as not to exceed a data rate that is set by the CPU 204. If the input rate is higher than a set rate, the data rate adjusting circuit 2403 in the present embodiment outputs a signal (hereinafter denoted with "STOP") for forbidding data input, to the buffer memory 2402. When "STOP" is input, the buffer memory 2402 holds data in an internal buffer, and when "STOP" is canceled, the buffer memory 2402 outputs data that has been held. A sensor correction circuit 2404 performs correction processing such as correction of flaws of pixels of the image sensor 202.

In the present embodiment, a peak rate of valid data is averaged using blanking periods during which valid data is not input. Here, the peak rate means the maximum value of bit rate on a communication bandwidth within a predetermined period. If the peak rate of data is not averaged, a bandwidth of the peak rate is applied to the DRAM 230 during valid data periods, and most of a DRAM bandwidth is used. As a result, access to the DRAM 230 is restricted in other processing during valid data periods, and data processing performance of the entire system is degraded. If access to the DRAM 230 performed in other processing is high-speed processing that will be complete in a blanking period, the performance of the system is not degraded even if the peak rate is not averaged, but if such high-speed processing is realized, cost and power consumption are increased. If the peak rate of data is averaged, the bandwidth of the peak rate applied to the DRAM 230 is reduced, and the DRAM 230 can be accessed in other processing. As a result, it is possible to prevent degradation of the data processing performance of the entire system due to the restriction of access to the DRAM 230 in other processing.

Figure 3:
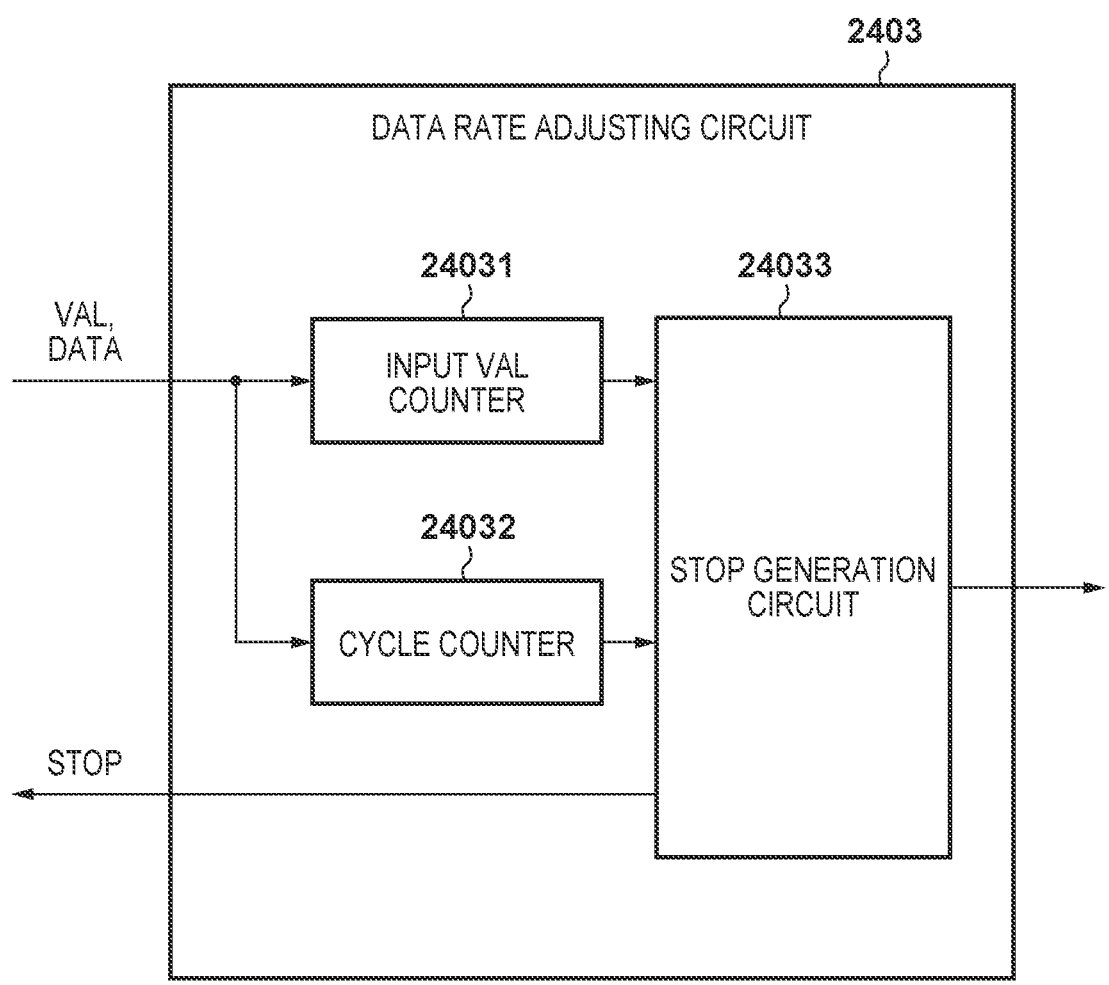
FIG. 3 is a block diagram showing a configuration of a data rate adjusting circuit in the first embodiment.

FIG. 3 is a block diagram showing a configuration of the data rate adjusting circuit 2403 in the present embodiment. A clock is input to the data rate adjusting circuit 2403 from a crystal oscillator or the like (not shown), and each block operates in synchronization with the clock. An input VAL counter 24031 counts the number of input VALs in synchronization with the clock. Upon VAL being input for the first time, a CYCLE counter 24032 starts to count an elapsed period (the number of elapsed cycles of the clock) in synchronization with the clock.

A STOP generation circuit 24033 controls a data rate by outputting "STOP" such that the current data rate does not become larger than a rate adjustment value that is set by the CPU 204. For example, assume that set CYCLE=10 and set VAL=5 are set as set rate adjustment values for controlling the data rate to 50%. Upon VAL being input, the input VAL counter 24031 and the CYCLE counter 24032 start counting. Here, assume that the counter value of the input VAL counter is 5 (the fifth VAL is input) when the counter value of the CYCLE counter is 7 (7 cycles have elapsed). At this time, the STOP generation circuit 24033 outputs "STOP" until the counter value of the CYCLE counter reaches 10 (10 cycles elapse) to stop input of VAL. Once the counter value of the CYCLE counter has reached 10, the counter values of the CYCLE counter and the input VAL counter are initialized, and then the above-described operation is repeated. Thus, the data rate adjusting circuit 2403 is kept from outputting data at a rate higher than the rate of 5 VALs per 10 CYCLEs, and the data rate is controlled to be not larger than 50%.

Figure 4A:
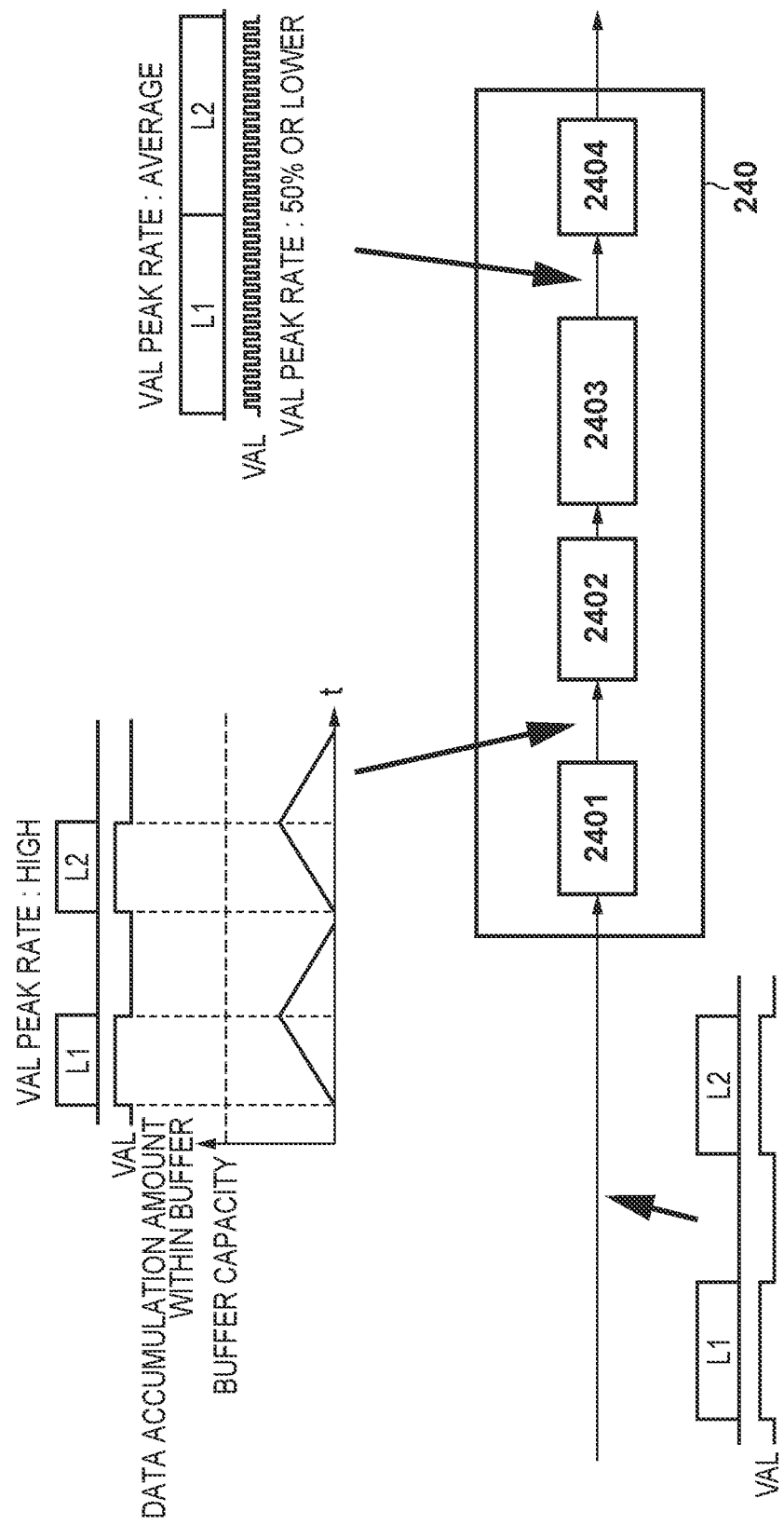
FIG. 4A is a diagram showing a variation of data rate adjustment according to the number of simultaneously read rows in the first embodiment.
Figure 4B:
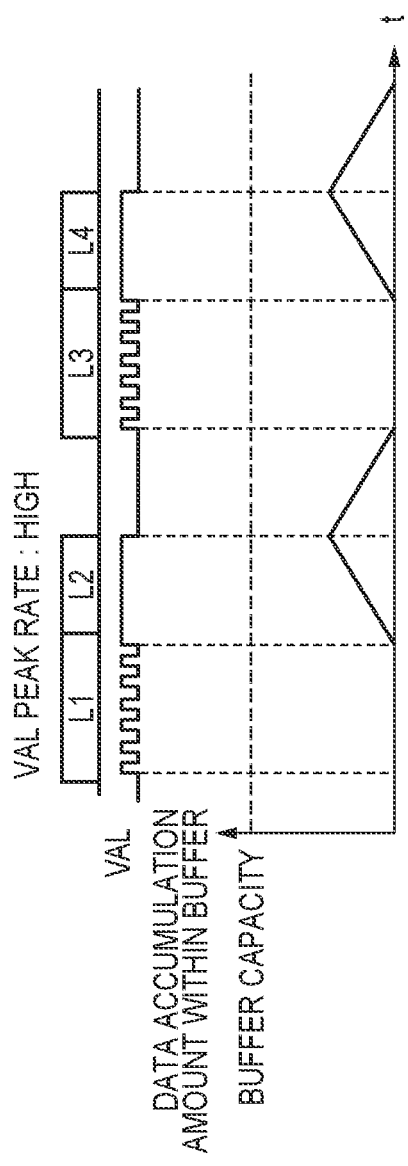
FIG. 4B is a diagram showing a variation of data rate adjustment according to the number of simultaneously read rows in the first embodiment.
Figure 4B:
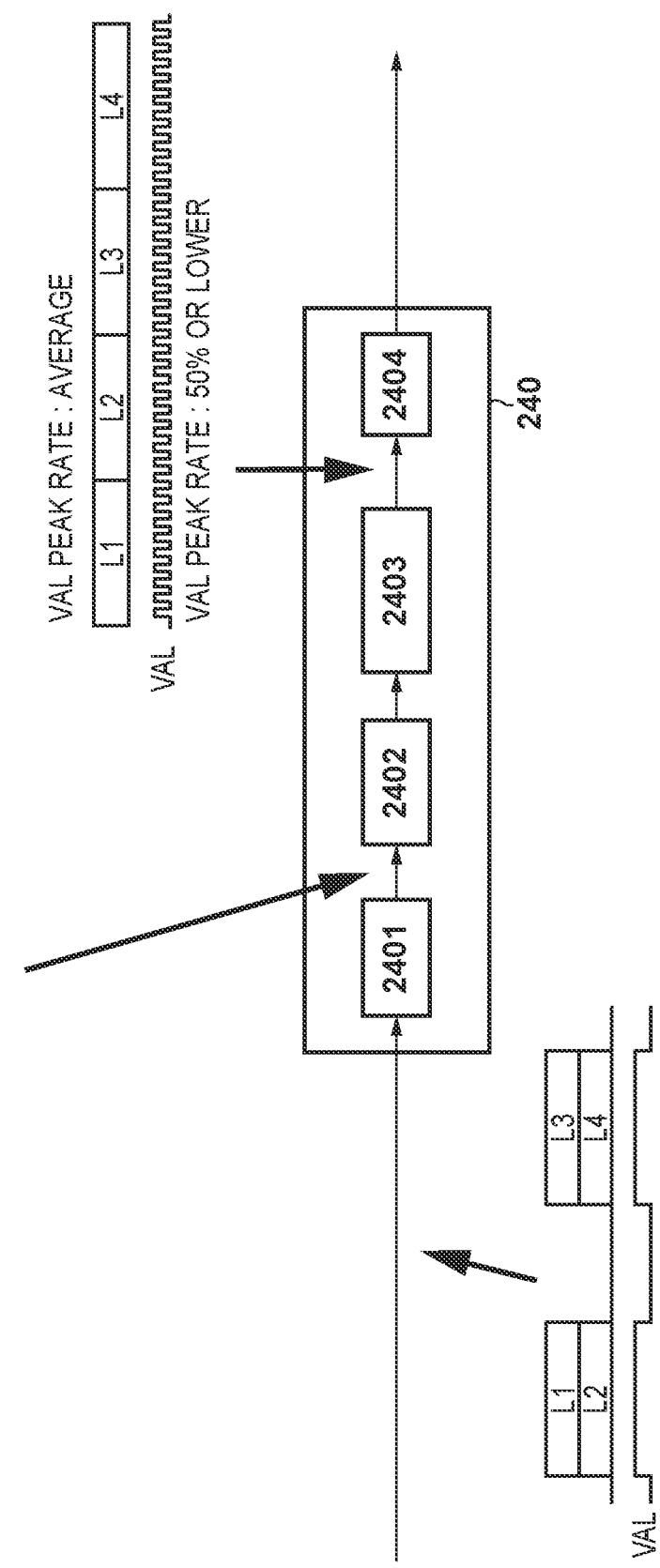
Figure 4C:
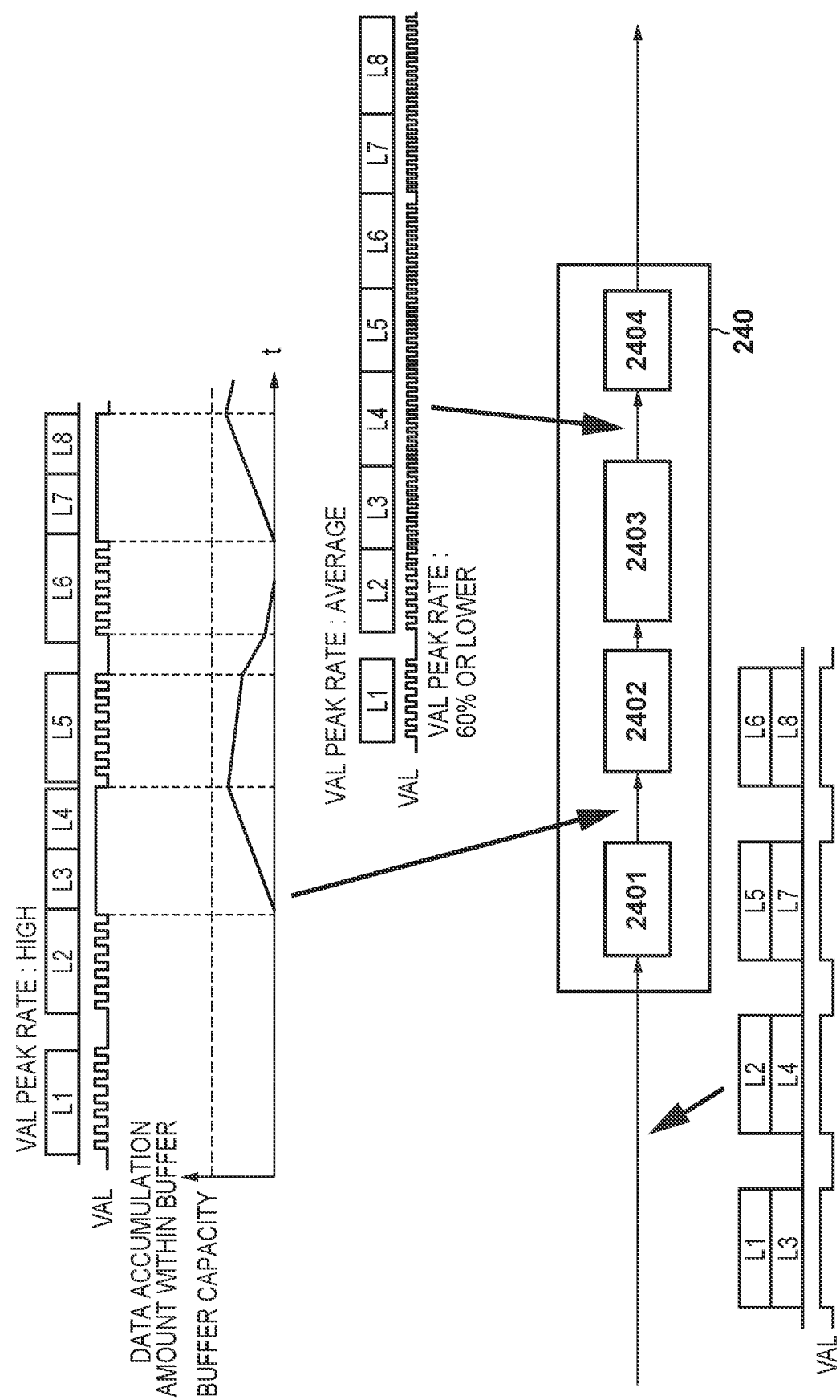
FIG. 4C is a diagram showing a variation of data rate adjustment according to the number of simultaneously read rows in the first embodiment.
Figure 4D:
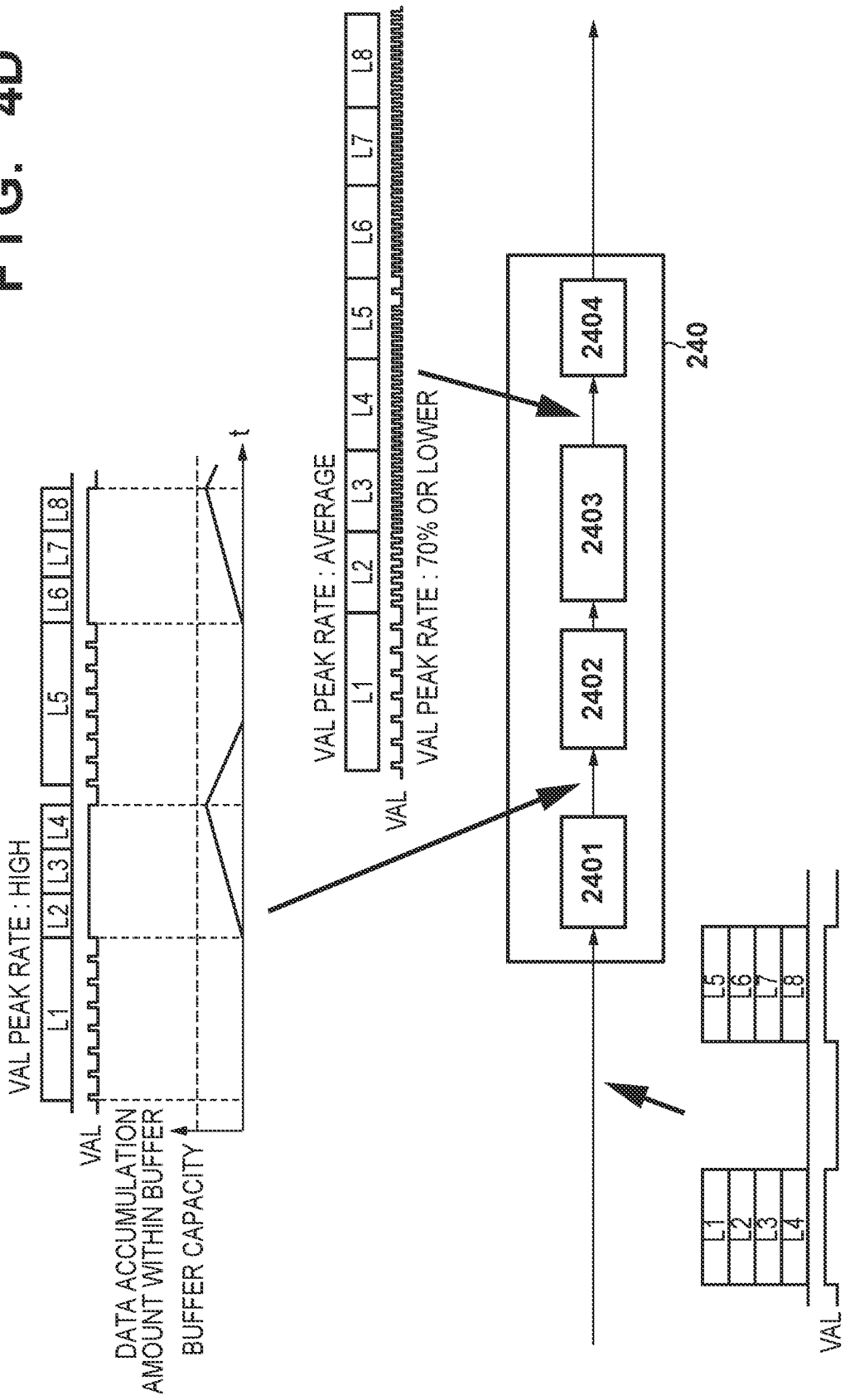
FIG. 4D is a diagram showing a variation of data rate adjustment according to the number of simultaneously read rows in the first embodiment.

FIGS. 4A to 4E are diagrams showing variations of data rate adjustment according to the number of rows of the image sensor 202 for which simultaneous reading is performed. FIG. 4A is a diagram showing data rate adjustment in the case of single row reading, FIG. 4B is a diagram showing data rate adjustment in a pattern 1 of two-row simultaneous reading, FIG. 4C is a diagram showing data rate adjustment in a pattern 2 of two-row simultaneous reading, FIG. 4D is a diagram showing data rate adjustment in a pattern 1 of four-row simultaneous reading, and FIG. 4E is a diagram showing data rate adjustment in a pattern 2 of four-row simultaneous reading.

Data rate adjustment in the case of single row reading, which is shown in FIG. 4A, will be described. Data is input to the captured image processing circuit 240 on row-by-row basis in the order of the first row (L1)→the second row (L2)→ . . . . The density of the input data rate varies, and there are valid data periods during which data is input and invalid data periods during which data is not input. The above-described processing is repeated for input data regarding the third and following rows. In the case of single row reading, the row rearrangement circuit 2401 does not rearrange data. The data rate adjusting circuit 2403 averages the peak rate of data using invalid data periods.

In the present embodiment, in the case of single row reading, the rate adjustment value is set such that the data rate becomes 50% or lower. The buffer memory 2402 holds data corresponding to "STOP" that is output from the data rate adjusting circuit 2403 during valid data periods, and outputs the held data during invalid data periods (in other words, periods during which the data rate of data output from the row rearrangement circuit 2401 is lower than 50%). If the output data rate is set to a value that is too low, "STOP" output from the data rate adjusting circuit 2403 is increased, and the volume of data to be held by the buffer memory 2402 exceeds the data capacity of the buffer memory 2402. Therefore, a data rate with which overflowing does not occur at the buffer memory 2402 is set in single row reading of the present embodiment.

Data rate adjustment in the pattern 1 of two-row simultaneous reading, which is shown in FIG. 4B, will be described. Data regarding two rows is input to the captured image processing circuit 240 at a time, in the order of the first row (L1) and the second row (L2)→the third row (L3) and the fourth row (L4)→ . . . . The density of the input data rate varies, and there are valid data periods during which data is input and invalid data periods during which data is not input. The row rearrangement circuit 2401 rearranges data such that data is output in the ascending order of the first row (L1)→the second row (L2)→ . . . . When data regarding the first row and the second row is input, the row rearrangement circuit 2401 holds data regarding the second row and outputs data regarding the first row. The row rearrangement circuit 2401 has a processing capacity that enables outputting of data at the same rate as the input data rate, and is capable of simultaneously outputting data regarding two rows. Therefore, if input data regarding the first row is output with no change in the data rate without being held in the row rearrangement circuit, the output data rate is 50%. After outputting data regarding the first row, the row rearrangement circuit 2401 outputs data regarding the second row that has been held in the row rearrangement circuit 2401, at a data rate of 100%. The above-described processing is repeated for the third and following rows.

The data rate adjusting circuit 2403 averages the peak rate of data using invalid data periods. In the present embodiment, in the case of the pattern 1 of two-row simultaneous reading, the rate adjustment value is set such that the data rate becomes 50% or lower. The buffer memory 2402 holds data corresponding to "STOP" output from the data rate adjusting circuit 2403 during valid data periods, and outputs the held data during invalid data periods. The row rearrangement circuit 2401 outputs data regarding the first row at a data rate of 50% and the data rate set in the data rate adjusting circuit 2403 is also 50%, and therefore data does not accumulate in the buffer memory 2402 during processing of the first row. The row rearrangement circuit 2401 outputs data regarding the second row at a data rate of 100% and the data rate set in the data rate adjusting circuit is 50%, and therefore data with a volume that corresponds to a single row×50% accumulates in the buffer memory 2402 during processing of the second row. The accumulated data is output during an invalid data period. In the pattern 1 of two-row simultaneous reading of the present embodiment, if the data rate is set to a value that is too low, "STOP" output from the data rate adjusting circuit 2403 is increased, and the volume of data to be held by the buffer memory 2402 exceeds the data capacity of the buffer memory 2402. Therefore, a data rate with which overflowing does not occur at the buffer memory 2402 is set in the pattern 1 of two-row simultaneous reading of the present embodiment.

Data rate adjustment in the pattern 2 of two-row simultaneous reading, which is shown in FIG. 4C, will be described. Data regarding two rows is input to the captured image processing circuit 240 at a time, in the order of the first row (L1) and the third row (L3)→the second row (L2) and the fourth row (L4)→ . . . . The density of the input data rate varies, and there are valid data periods during which data is input and invalid data periods during which data is not input. The row rearrangement circuit 2401 rearranges data such that data is output on row-by-row basis in the ascending order of the first row (L1)→the second row (L2)→ . . . . When data regarding the first row and the third row is input, the row rearrangement circuit 2401 holds data regarding the third row and outputs data regarding the first row. The row rearrangement circuit 2401 has a processing capacity that enables outputting of data at the same rate as the input data rate, and is capable of simultaneously outputting data regarding two rows. Therefore, if input data regarding the first row is output with no change in the data rate without being held in the row rearrangement circuit, the output data rate is 50%.

The row rearrangement circuit 2401 does not output data regarding the third row that is held in the row rearrangement circuit 2401, even after outputting data regarding the first row. When data regarding the second row and the fourth row is input, the row rearrangement circuit outputs data regarding the second row while holding data regarding the fourth row. Data regarding the second row is output at a data rate of 50%. After outputting data regarding the second row, the row rearrangement circuit outputs data regarding the third row and the fourth row that has been held in the row rearrangement circuit, at a data rate of 100%. The above-described processing is repeated for the fifth and following rows. The data rate adjusting circuit 2403 averages the peak rate of data using invalid data periods. In the present embodiment, in the case of the pattern 2 of two-row simultaneous reading, the data rate adjustment value is set such that the data rate becomes 60% or lower.

The buffer memory 2402 holds data corresponding to "STOP" output from the data rate adjusting circuit 2403 during valid data periods, and outputs the held data during invalid data periods. The row rearrangement circuit 2401 outputs data regarding the first row and the second row at a data rate of 50% and the data rate set in the data rate adjusting circuit is 60%, and therefore data does not accumulate in the buffer memory 2402 during processing of the first and second rows. The row rearrangement circuit 2401 outputs data regarding the third row and the fourth row at a data rate of 100% and the data rate set in the data rate adjusting circuit is 60%, and therefore data with a volume that corresponds to two rows×40% accumulates in the buffer memory 2402 during processing of the third and fourth rows. The accumulated data is output during an invalid data period.

If the output rate of the buffer memory 2402 is not 100%, the longer a period during which the row rearrangement circuit 2401 outputs data at a data rate of 100% is, the larger the volume of data that is temporarily stored in the buffer memory 2402 is. In the case of the capacity of the buffer memory 2402 of the present embodiment, if the rate adjustment value in the pattern 2 of two-row simultaneous reading is set to 50%, which is the same as the rate adjustment value in the pattern 1 of two-row simultaneous reading, overflowing occurs at the buffer memory 2402, and therefore the rate adjustment value is set to 60%.

Data rate adjustment in the pattern 1 of four-row simultaneous reading, which is shown in FIG. 4D, will be described. Data regarding four rows is input to the captured image processing circuit 240 at a time, in the order of the first row (L1), the second row (L2), the third row (L3), and the fourth row (L4)→the fifth row (L5), the sixth row (L6), the seventh row (L7), and the eighth row (L8)→ . . . . The density of the input data rate varies, and there are valid data periods during which data is input and invalid data periods during which data is not input. The row rearrangement circuit 2401 rearranges data such that data is output on row-by-row basis in the ascending order of the first row (L1)→the second row (L2)→ . . . .

When data regarding the first to fourth rows is input, the row rearrangement circuit 2401 holds data regarding the second to fourth rows and outputs data regarding the first row. The row rearrangement circuit 2401 has a processing capacity that enables outputting of data at the same rate as the input data rate, and is capable of simultaneously outputting data regarding four rows. Therefore, if input data regarding the first row is output with no change in the data rate without being held in the row rearrangement circuit, the output data rate is 25%. After outputting data regarding the first row, the row rearrangement circuit 2401 outputs data regarding the second to fourth rows that has been held in the row rearrangement circuit 2401, at a data rate of 100%. The above-described processing is repeated for the fifth and following rows.

The data rate adjusting circuit 2403 averages the peak rate of data using invalid data periods. In the present embodiment, in the case of the pattern 1 of four-row simultaneous reading, the rate adjustment value is set such that the data rate becomes 70% or lower. The buffer circuit 2402 holds data corresponding to "STOP" output from the data rate adjusting circuit 2403 during valid data periods, and outputs the held data during invalid data periods. The row rearrangement circuit 2401 outputs data regarding the first row at a data rate of 25% and the data rate set in the data rate adjusting circuit is 70%, and therefore data does not accumulate in the buffer memory 2402 during processing of the first row. The row rearrangement circuit 2401 outputs data regarding the second to fourth rows at a data rate of 100% and the data rate set in the data rate adjusting circuit is 70%, and therefore data with a volume that corresponds to three rows×30% accumulates in the buffer memory 2402 during processing of the second to fourth rows. The accumulated data is output during an invalid data period.

If the output rate of the buffer memory 2402 is not 100%, the longer a period during which the row rearrangement circuit 2401 outputs data at a data rate of 100% is, the larger the volume of data that is temporarily stored in the buffer memory 2402 is. In the case of the capacity of the buffer memory 2402 of the present embodiment, if the rate adjustment value in the pattern 1 of four-row simultaneous reading is set to 60%, which is the same as the rate adjustment value in the pattern 2 of two-row simultaneous reading, overflowing occurs at the buffer memory 2402, and therefore the rate adjustment value is set to 70%.

Data rate adjustment in the pattern 2 of four-row simultaneous reading, which is shown in FIG. 4E, will be described. Data regarding four rows is input to the captured image processing circuit 240 at a time, in the order of the first row (L1), the fifth row (L5), the sixth row (L6), and the second row (L2)→the seventh row (L7), the third row (L3), the eighth row (L8), and the fourth row (L4)→ . . . . The density of the input data rate varies, and there are valid data periods during which data is input and invalid data periods during which data is not input. The row rearrangement circuit 2401 rearranges data such that data is output on row-by-row basis in the ascending order of the first row (L1)→the second row (L2)→ . . . . When data regarding the first, fifth, sixth, and second rows is input, the row rearrangement circuit 2401 holds data regarding the fifth, sixth, and second rows and outputs data regarding the first row. The row rearrangement circuit 2401 has a processing capacity that enables outputting of data at the same rate as the input data rate, and is capable of simultaneously outputting data regarding four rows. Therefore, if input data regarding the first row is output with no change in the data rate without being held in the row rearrangement circuit, the output data rate is 25%.

After outputting data regarding the first row, the row rearrangement circuit 2401 outputs data regarding the second row that has been held in the row rearrangement circuit 2401, at a data rate of 100%. The row rearrangement circuit 2401 does not output data regarding the fifth and sixth rows held in the row rearrangement circuit 2401, even after outputting data regarding the second row. When data regarding the seventh, third, eighth, and fourth rows is input, the row rearrangement circuit outputs data regarding the third row while holding data regarding the fourth, seventh, and eighth rows. Data regarding the third row is output at a data rate of 25%.

After outputting data regarding the third row, the row rearrangement circuit outputs data regarding the fourth to eighth rows that has been held in the row rearrangement circuit, at a data rate of 100%. The above-described processing is repeated for the ninth and following rows. The data rate adjusting circuit 2403 averages the peak rate of data using invalid data periods. In the present embodiment, in the case of the pattern 2 of four-row simultaneous reading, the rate adjustment value is set such that the data rate becomes 80% or lower. The buffer memory 2402 holds data corresponding to "STOP" output from the data rate adjusting circuit 2403 during valid data periods, and outputs the held data during invalid data periods. The row rearrangement circuit 2401 outputs data regarding the first row at a data rate of 25% and the data rate set in the data rate adjusting circuit is 80%, and therefore data does not accumulate in the buffer memory 2402 during processing of the first row. The row rearrangement circuit 2401 outputs data regarding the second row at a data rate of 100% and the data rate set in the data rate adjusting circuit is 80%, and therefore data with a volume that corresponds to a single row×20% accumulates in the buffer memory 2402 during processing of the second row.

The row rearrangement circuit 2401 outputs data regarding the third row at a data rate of 25% and the data rate set in the data rate adjusting circuit is 80%, and therefore the buffer memory 2402 outputs the remaining portion of data regarding the second row that has been held in the buffer memory 2402 and data regarding the third row, during processing of the third row. The row rearrangement circuit 2401 outputs data regarding the fourth to eighth rows at a data rate of 100% and the data rate set in the data rate adjusting circuit is 80%, and therefore data with a volume that corresponds to five rows×20% accumulates in the buffer memory 2402 during processing of the fourth to eighth rows. The accumulated data is output during an invalid data period.

If the output rate of the buffer memory 2402 is not 100%, the longer a period during which the row rearrangement circuit 2401 outputs data at a data rate of 100% is, the larger the volume of data that is temporarily stored in the buffer memory 2402 is. In the case of the capacity of the buffer memory 2402 of the present embodiment, if the rate adjustment value in the pattern 2 of four-row simultaneous reading is set 70%, which is the same as the rate adjustment value in the pattern 1 of four-row simultaneous reading, overflowing occurs at the buffer memory 2402, and therefore the rate adjustment value is set to 80%.

Figure 5:
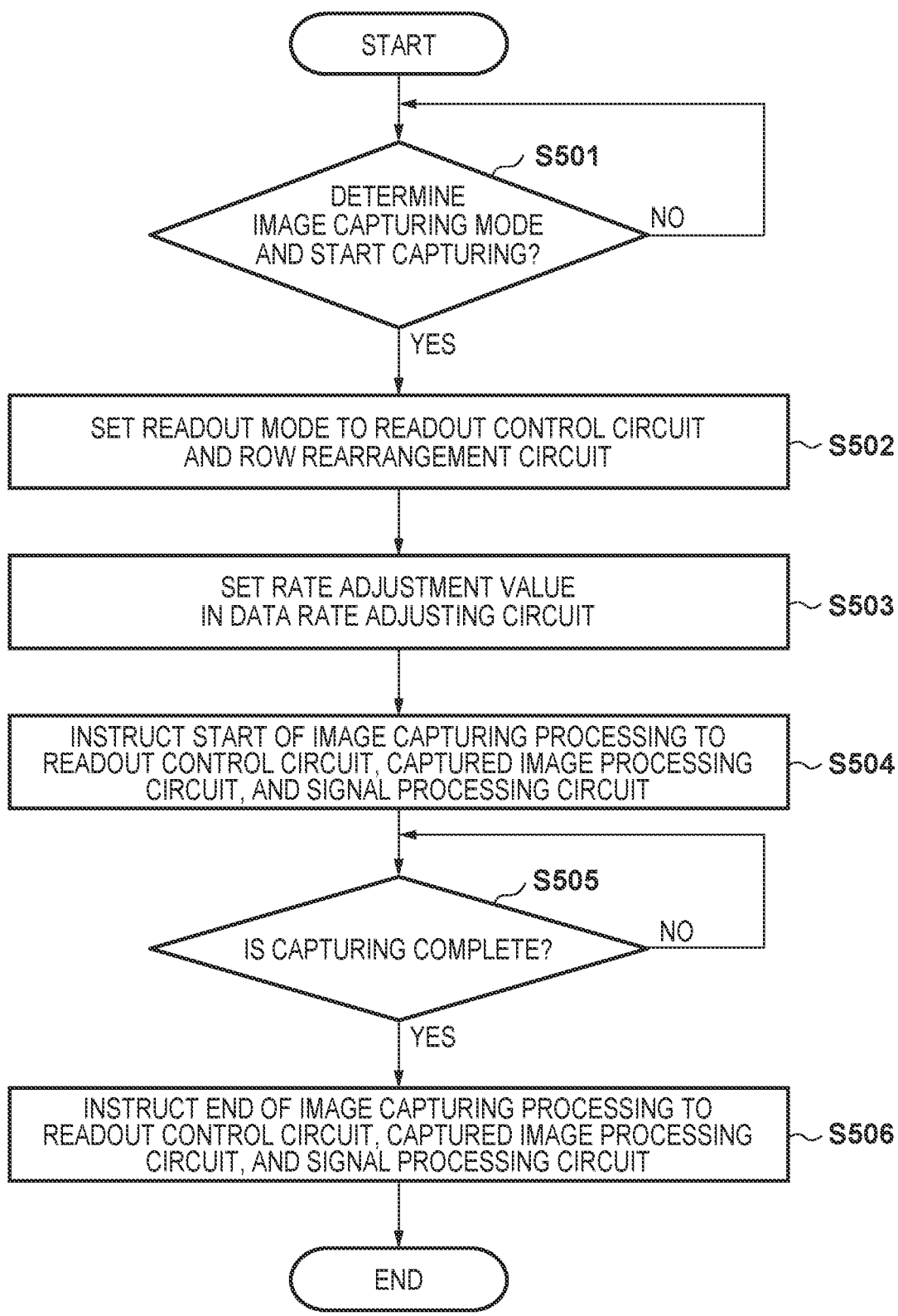
FIG. 5 is a flowchart showing an image data capturing sequence in the first embodiment.

FIG. 5 is a flowchart showing an image data capturing sequence in the present embodiment.

In step S501 of FIG. 5, the CPU 204 determines whether or not an image capturing mode is set by a user and an instruction to start image capturing is issued. If an instruction to start image capturing is issued, the routine proceeds to step S502, and otherwise the CPU waits in that state.

In step S502, a readout mode that specifies the number and positions of rows of the image sensor 202 from which data is simultaneously read, and the like is set in the readout control circuit 207 and the row rearrangement circuit 2401. In step S503, the CPU 204 sets a rate adjustment value in the data rate adjusting circuit 2403 based on the image capturing mode set by the user.

In step S504, the CPU 204 instructs the readout control circuit 207, the captured image processing circuit 240, and the signal processing circuit 210 to start image capturing processing. In step S505, the CPU 204 determines whether or not the image capturing processing is complete. If the image capturing processing is complete, the routine proceeds to step S506, and otherwise the CPU waits for completion of the image capturing processing. In step S506, the CPU 204 instructs the readout control circuit 207, the captured image processing circuit 240, and the signal processing circuit 210 to end the image capturing processing.

As described above, according to the above-described embodiment, the peak rate of a captured image is controlled so as not to take up the memory bus bandwidth, and therefore data can be processed at a high speed. In the control performed in the present embodiment, control for reducing the amount of information regarding captured image data is not performed for the purpose of reducing the memory bus bandwidth, and therefore the quality of a recorded image is not degraded.

In the present embodiment, single row reading, the patterns 1 and 2 of two-row simultaneous reading, and the patterns 1 and 2 of four-row simultaneous reading are described as readout modes that specify the number and positions of rows of the image sensor 202 from which data is simultaneously read and the like, but another readout mode may also be employed. For example, a readout mode in which addition of a plurality of rows is performed or a readout mode in which thinning is performed at a predetermined cycle may also be employed. Also, the rate adjustment value set in the data rate adjusting circuit 2403 may also be varied from those in the present embodiment.

The data rate adjusting circuit 2403 in the present embodiment is configured to output "STOP" from the STOP generation circuit 24033 based on values counted by the input VAL counter 24031 and the CYCLE counter 24032. However, another configuration may also be employed so long as the data rate can be adjusted. In the present embodiment, the DRAM is used as the memory, but a memory other than the DRAM may also be used.

Second Embodiment

The following describes a second embodiment of the present invention. Configurations of the image capturing device and the data rate adjusting circuit in the second embodiment are similar to those in the first embodiment, and therefore descriptions thereof are omitted. The present embodiment differs from the first embodiment in data readout control performed by the readout control circuit 207, the configuration of the captured image processing circuit, and the image data capturing sequence.

Figure 6A:
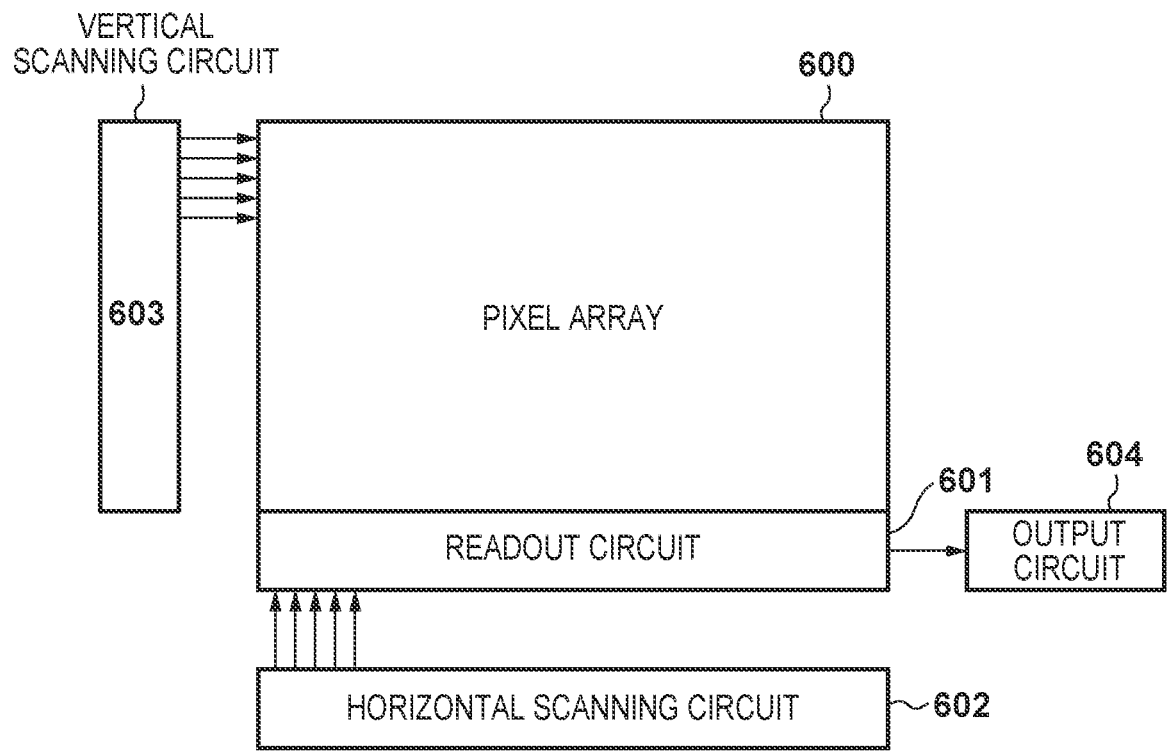
FIG. 6A is a diagram showing a configuration of an image sensor in a second embodiment.
Figure 6B:
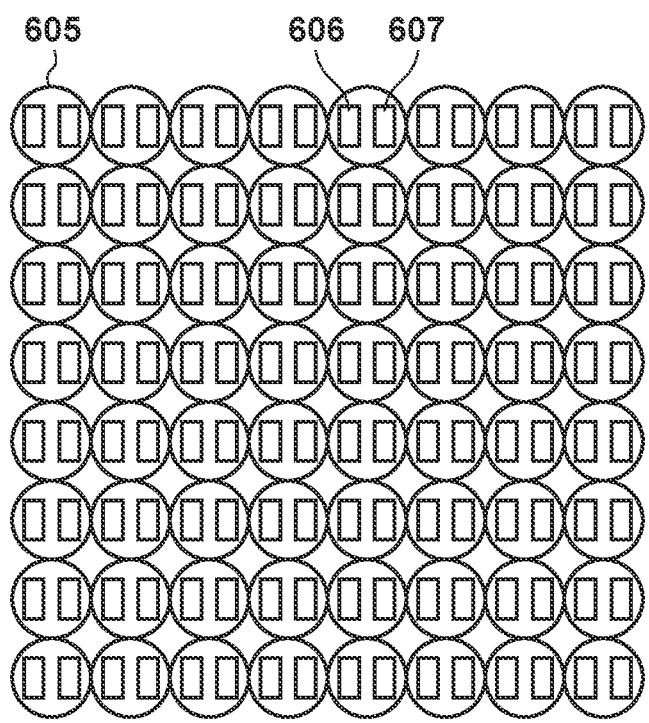
FIG. 6B is a diagram showing a configuration of the image sensor in the second embodiment.

FIGS. 6A and 6B are diagrams showing a configuration of the image sensor 202. FIG. 6A shows the configuration of the image sensor 202. In FIG. 6A, the image sensor 202 includes a pixel array 600 in which pixels are two-dimensionally arranged, a vertical scanning circuit 603 that selects rows of pixels of the pixel array 600, and a horizontal scanning circuit 602 that selects columns of pixels of the pixel array 600. The image sensor 202 further includes a readout circuit 601 for reading out signals of pixels that are selected by the vertical scanning circuit 603 and the horizontal scanning circuit 602 from the pixels in the pixel array 600. The vertical scanning circuit 603 selects a row of the pixel array 600. The readout circuit 601 includes amplifiers and memories that are provided for respective columns, and stores pixel signals of a scanned row in the memories via the amplifiers. Pixel signals of a single row stored in the memories are sequentially selected by the horizontal scanning circuit 602 in the direction of the columns and are output via an output circuit 604 to the outside. This operation is repeated to output signals of all pixels to the outside.

FIG. 6B shows a structure of the pixel array 600 of the image sensor 202. In FIG. 6B, microlenses 605 constitute a microlens array. Photodiodes (PDs) 606 and 607 are photoelectric conversion means that perform photoelectric conversion. Here, the PD 606 will be referred to as an A image photoelectric conversion unit and the PD 607 will be referred to as a B image photoelectric conversion unit. Each pixel is constituted by two PDs and a microlens 605 that is arranged above the PDs. The PD 606 and the PD 607 have a pupil division configuration, and images that have parallax with respect to each other and are obtained by dividing a light flux that passes through a pupil of an image capturing optical system into two or more are respectively incident on the PD 606 and the PD 607. Although FIG. 6B shows a configuration in which two PDs are arranged for a microlens, but a configuration is also possible in which three or more PDs are arranged for a microlens to perform pupil division. Note that the pixels include color filters of the Bayer arrangement although this is not shown in FIG. 6B.

In the structure of the pixel array 600 shown in FIG. 6B, each pixel includes a plurality of photoelectric conversion units, but the present invention is not limited to this configuration. For example, a configuration is also possible in which pupil division is performed by shielding a portion of a pixel or configuring a microlens across a plurality of pixels.

The image sensor 202 has three readout modes and can change a readout mode to be used, for each row. A first mode is a mode in which an A+B image that is obtained by adding signals respectively accumulated in the PD 606 and the PD 607 is output. The A+B image is used as a recorded image that is subjected to image processing and is recorded in a medium or the like. A second mode is a mode in which an A image signal and a B image signal (a plurality of types of signals) accumulated in the PD 606 and the PD 607 are output separately from each other. Correlation operation processing is performed on the A image signal and the B image signal using a known method in later processing, and a driving amount of a focus lens and the like can be computed using a result of the processing. Furthermore, as a result of the A+B image being generated by adding the A image signal and the B image signal in later processing, the A+B image can be used as a recorded image. A third mode is a mode in which an A image signal and an A+B image signal are output. Correlation operation processing is performed on the A image signal and the A+B image signal using a known method in later processing, and a driving amount of a focus lens and the like can be computed using a result of the processing. The A+B image is used as a recorded image. Also, an output data volume of the A image signal can be controlled, and data with a smaller volume than that of the A+B image can be output with the A image signal. Note that if only some pixels in the pixel array 600 have the pupil division configuration, it is also possible to perform a correlation operation on output from the pupil-divided pixels, and perform image processing on output from regular pixels to use an image obtained through the image processing as a recorded image.

Figure 7:
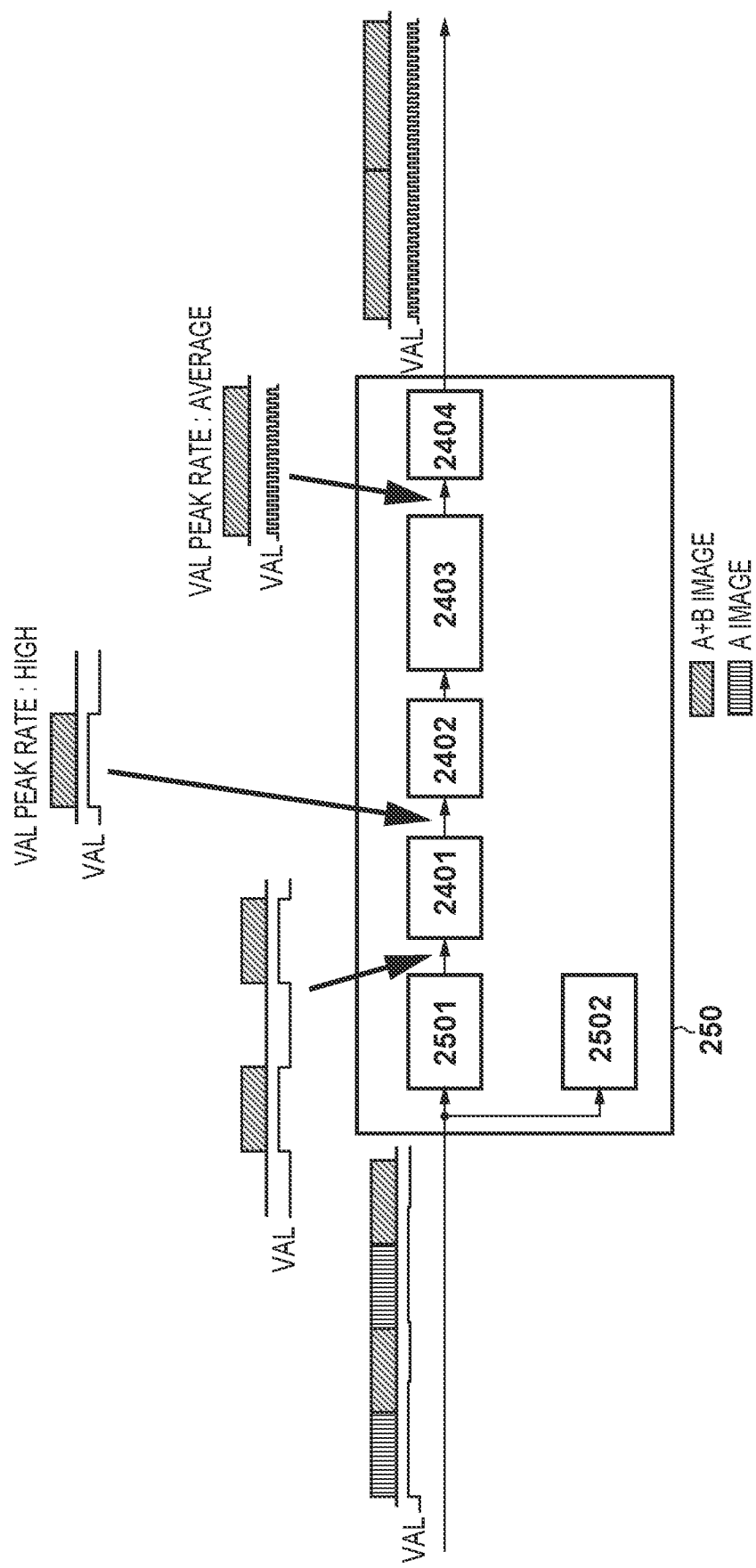
FIG. 7 is a block diagram showing a configuration of a captured image processing circuit in the second embodiment.

FIG. 7 is a diagram showing a configuration of a captured image processing circuit 250 in the present embodiment. Configurations of the row rearrangement circuit 2401, the buffer memory 2402, the data rate adjusting circuit 2403, and the sensor correction circuit 2404 are the same as those in the first embodiment. The present embodiment differs from the first embodiment in that a parallax image is processed by a parallax image separation circuit 2501 and a parallax image processing circuit 2502. FIG. 7 shows a case in which an A image and an A+B image are read from the image sensor 202 through single row reading. The parallax image processing circuit 2502 performs correlation operation processing using a known method to drive a focus lens.

The parallax image separation circuit 2501 separates the input A image and outputs only the A+B image. Even if data is input to the parallax image separation circuit 2501 at a data rate of 100%, invalid data periods (blanking) are generated in output data as a result of the A image being separated. The data rate adjusting circuit 2403 averages the peak rate of data using the invalid data periods (blanking). Note that the image sensor 202 can select a readout mode for each row, and accordingly, in the case of rows from which the A image and the A+B image are read, invalid data periods are generated after the A image is separated, but invalid data periods are not generated in the case of rows from which only the A+B image is read. Therefore, if the readout mode is changed between rows, the length of invalid data periods (blanking) also varies between rows. Note that FIG. 7 shows a case in which the A image and the A+B image are read through single row reading for the sake of convenience of description, but similar control can also be performed in a case in which as a result of a plurality of rows or columns being added, the A image and the A+B image that correspond to a single row are processed. Also, a plurality of color filters may be included in the range of addition.

Figure 8:
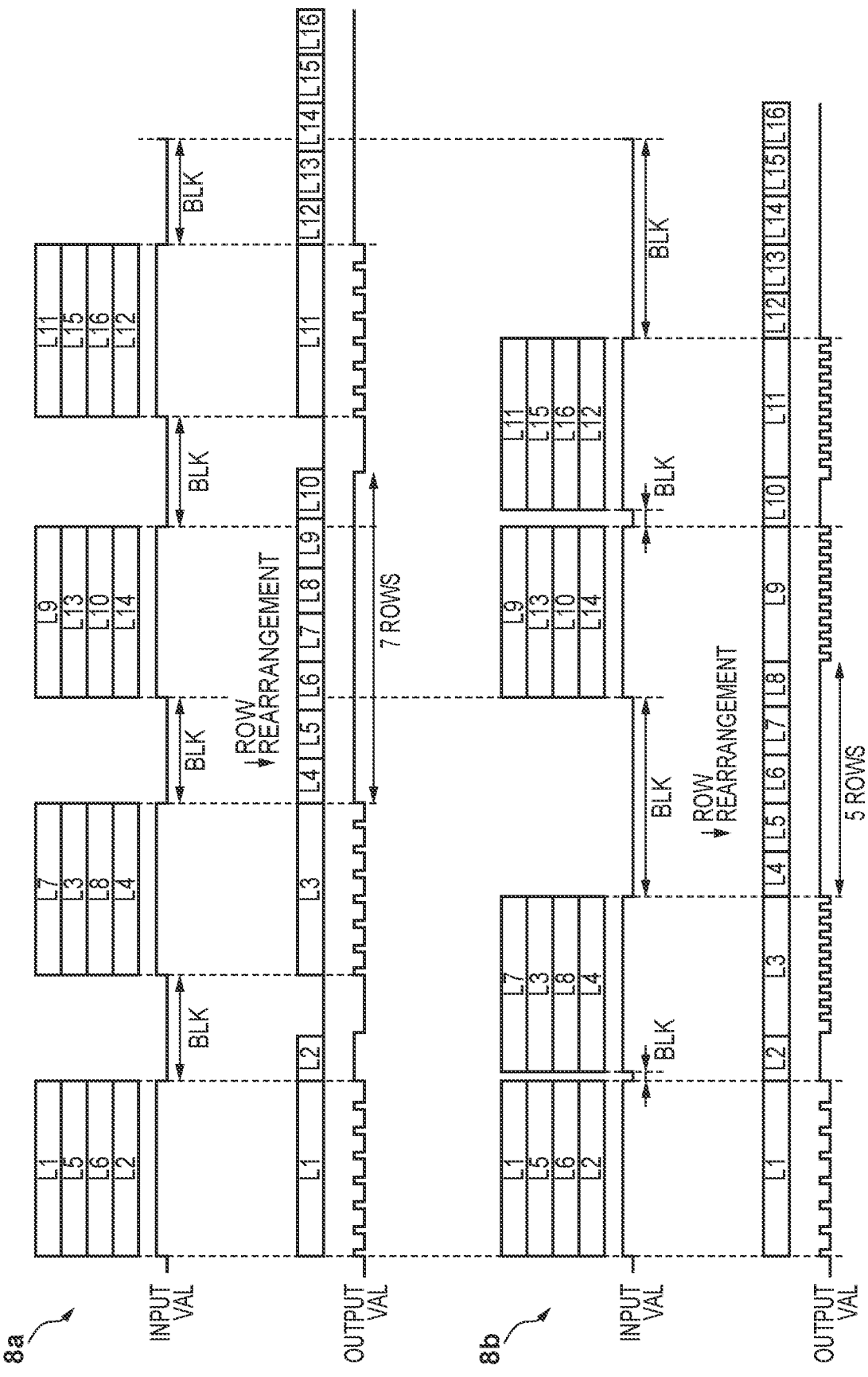
FIG. 8 is a diagram showing output data rates of a row rearrangement circuit according to different invalid data input periods in the second embodiment.

FIG. 8 is a diagram showing output data rates of the row rearrangement circuit 2401 in a case in which the length of invalid data periods (blanking) input to the row rearrangement circuit 2401 is the same for each row and a case in which the length varies between rows. FIG. 8 shows the cases of the pattern 2 of four-row simultaneous reading already described in the first embodiment.

8*a* in FIG. 8 is a diagram showing the output data rate of the row rearrangement circuit 2401 in the case in which the length of invalid data periods (blanking) input to the row rearrangement circuit 2401 is the same. This is the case of four-row simultaneous reading, and accordingly, an invalid data period (blanking) of the same length is input for every four rows. Data regarding four rows is input to the row rearrangement circuit 2401 at a time, in the order of the first row (L1), the fifth row (L5), the sixth row (L6), and the second row (L2)→the seventh row (L7), the third row (L3), the eighth row (L8), and the fourth row (L4)→ . . . . The length of the input invalid data period (blanking) is the same for every four rows. The row rearrangement circuit 2401 rearranges data such that data is output on row-by-row basis in the ascending order of the first row (L1)→the second row (L2)→ . . . . When data regarding the first, fifth, sixth, and second rows is input, the row rearrangement circuit 2401 holds data regarding the fifth, sixth, and second rows, and outputs data regarding the first row. The row rearrangement circuit 2401 has a processing capacity that enables outputting of data at the same rate as the input data rate, and is capable of simultaneously outputting data regarding four rows. Therefore, if input data regarding the first row is output with no change in the data rate, the output data rate is 25%. After outputting data regarding the first row, the row rearrangement circuit 2401 outputs data regarding the second row that has been held in the row rearrangement circuit 2401, at a data rate of 100%. The row rearrangement circuit 2401 does not output data regarding the fifth and sixth rows held in the row rearrangement circuit 2401, even after outputting data regarding the second row. When data regarding the seventh, third, eighth, and fourth rows is input, the row rearrangement circuit outputs data regarding the third row while holding data regarding the fourth, seventh, and eighth rows. Data regarding the third row is output at a data rate of 25%. After outputting data regarding the third row, the row rearrangement circuit outputs data regarding the fourth to eighth rows that has been held in the row rearrangement circuit, at a data rate of 100%.

In the present embodiment, data regarding the ninth, 13th, tenth, and 14th rows is input while data regarding the fourth to eighth rows is output, and the row rearrangement circuit 2401 holds the input data. After outputting data regarding the eighth row, the row rearrangement circuit 2401 outputs data regarding the ninth to tenth rows that has been held in the row rearrangement circuit 2401, at a data rate of 100%. In the present embodiment, input invalid data periods (blanking) are short, and therefore the row rearrangement circuit 2401 continuously outputs data with no interruption between data regarding the eighth row and data regarding the ninth row. Thus, the row rearrangement circuit 2401 outputs data regarding seven rows, i.e., the fourth to tenth rows, at a data rate of 100%. When data regarding the eleventh, 15th, 16th, and twelfth rows is input, the row rearrangement circuit 2401 outputs data regarding the eleventh row while holding data regarding the twelfth, 15th, and 16th rows. Data regarding the eleventh row is output at a data rate of 25%. After outputting data regarding the eleventh row, the row rearrangement circuit outputs data regarding the twelfth to 16th rows that has been held in the row rearrangement circuit, at a data rate of 100%.

8b in FIG. 8 is a diagram showing the output data rate of the row rearrangement circuit 2401 in the case in which the length of invalid data periods (blanking) input to the row rearrangement circuit 2401 varies. This is the case of four-row simultaneous reading, and therefore an invalid data period (blanking) is input for every four rows. 8b in FIG. 8 shows an example of a case in which an invalid data period (blanking) is input for every four rows such that a short invalid data period and a long invalid data period are alternately input.

In the present embodiment, the sum of lengths of invalid data periods (blanking) of a single plane of an image is the same between 8a and 8b in FIG. 8, and therefore, the time it takes to read out a single plane of an image is the same between 8a and 8b. When data regarding the first, fifth, sixth, and second rows is input, the row rearrangement circuit 2401 holds data regarding the fifth, sixth, and second rows, and outputs data regarding the first row at a data rate of 25%. After outputting data regarding the first row, the row rearrangement circuit 2401 outputs data regarding the second row that has been held in the row rearrangement circuit 2401, at a data rate of 100%. When data regarding the seventh, third, eighth, and fourth rows is input, the row rearrangement circuit outputs data regarding the third row while holding data regarding the fourth, seventh, and eighth rows, and after outputting data regarding the third row, outputs data regarding the fourth to eighth rows that has been held in the row rearrangement circuit, at a data rate of 100%. When data regarding the ninth, 13th, tenth, and 14th rows is input, the row rearrangement circuit outputs data regarding the ninth row while holding data regarding the 13th, tenth, and 14th rows, and after outputting data regarding the ninth row, outputs data regarding the tenth row that has been held in the row rearrangement circuit, at a data rate of 100%. In the present embodiment, an invalid data period (blanking) input between the eighth row and the ninth row is long, and therefore the data rate of data regarding the ninth row output from the row rearrangement circuit 2401 is not 100%, and the row rearrangement circuit 2401 outputs data regarding the fourth to eighth rows, i.e., five rows, at a data rate of 100%. When data regarding the eleventh, 15th, 16th, and twelfth rows is input, the row rearrangement circuit outputs data regarding the eleventh row while holding data regarding the twelfth, 15th, and 16th rows, and after outputting data regarding the eleventh row, outputs data regarding the twelfth to 16th rows that has been held in the row rearrangement circuit, at a data rate of 100%.

As described above, if the length of input invalid data periods (blanking) is varied between rows, variation in the density of the output data rate of the row rearrangement circuit 2401 also changes. If the output rate of the buffer memory 2402 is not 100% as a result of data rate adjustment, the shorter a period during which the row rearrangement circuit 2401 outputs data at a data rate of 100% is, the smaller the volume of data that is temporarily accumulated in the buffer memory 2402 is. Therefore, if the period during which the row rearrangement circuit 2401 outputs data at a data rate of 100% is shortened by varying the length of input invalid data periods (blanking) between rows, the volume of data temporarily accumulated in the buffer memory 2402 can be reduced. The longest period during which the row rearrangement circuit 2401 outputs data at a data rate of 100% corresponds to 7 rows in the case of 8a in FIG. 8 and 5 rows in the case of 8b in FIG. 8, and therefore, the volume of data temporarily stored in the buffer memory 2402 is smaller in the case of 8b in FIG. 8.

Figure 9:
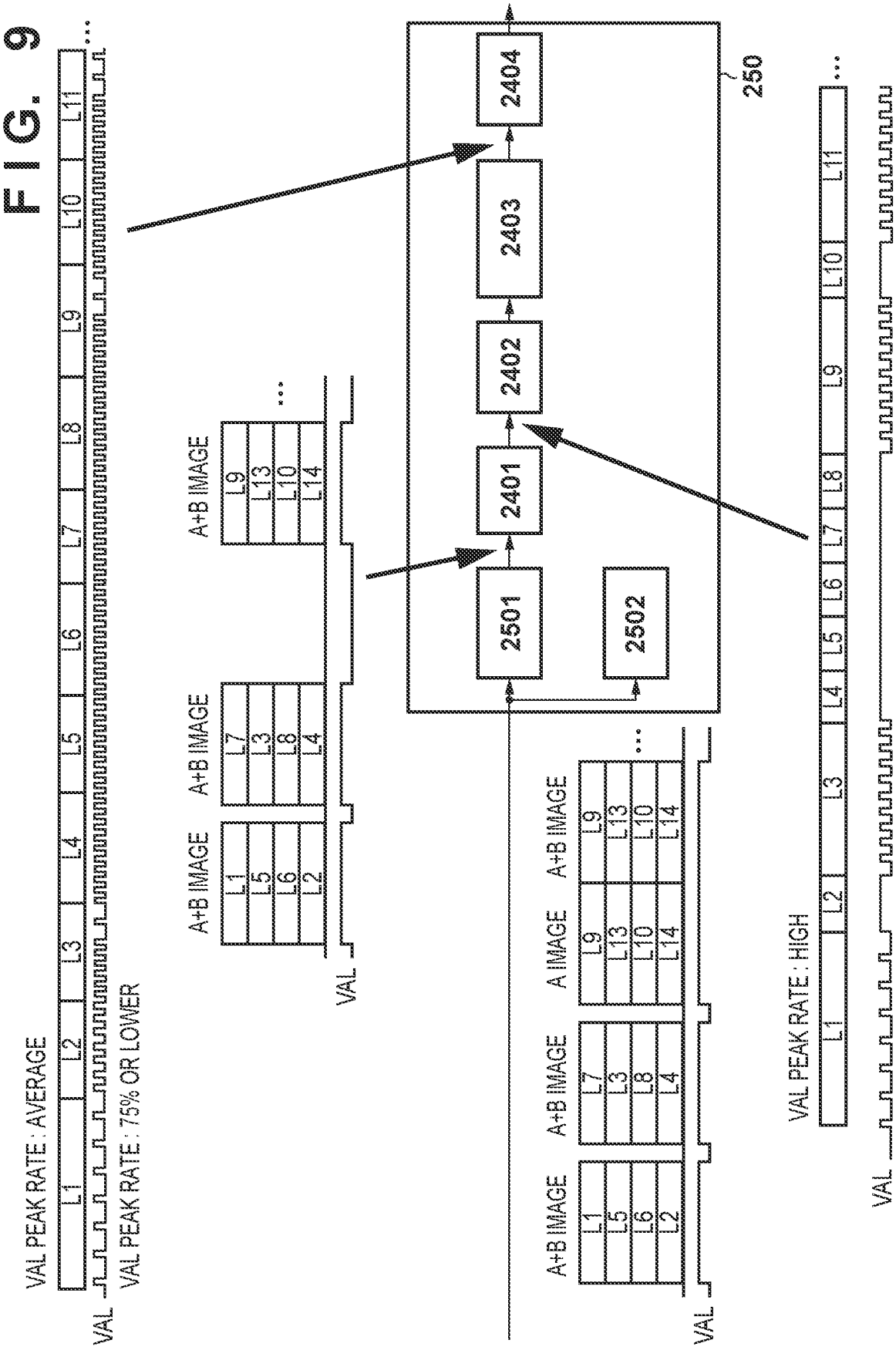
FIG. 9 is a diagram showing data rate adjustment in the second embodiment.

FIG. 9 is a diagram showing data rate adjustment in the pattern 2 of four-row simultaneous reading in the present embodiment. In the present embodiment, data is read from the image sensor 202 while selecting rows from which only the A+B image is read and rows from which both the A image and the A+B image are read, and after the A+B image is read from eight rows, the A image is read from four rows. The parallax image separation circuit 2501 separates the input A image and outputs only the A+B image, and therefore invalid data periods (blanking) are generated in output data as a result of the A image being separated. The data rate adjusting circuit 2403 averages the peak rate of data using the invalid data periods (blanking). The input and output data rates of the row rearrangement circuit 2401 are as described above regarding 8b in FIG. 8, and in the present embodiment, rows from which the A image is read are selected to shorten the period during which the row rearrangement circuit 2401 outputs data at data rate of 100%. In the present embodiment, if a period during which the row rearrangement circuit 2401 consecutively outputs data regarding the A+B image corresponds to six or more rows, the A image is selected to be read from a row that is read right after the period. Thus, the volume of data temporarily accumulated in the buffer memory 2402 can be reduced, and accordingly, the output data rate can be further reduced. In the present embodiment, the rate adjustment value is set such that the data rate becomes 75% or lower.

Figure 10:
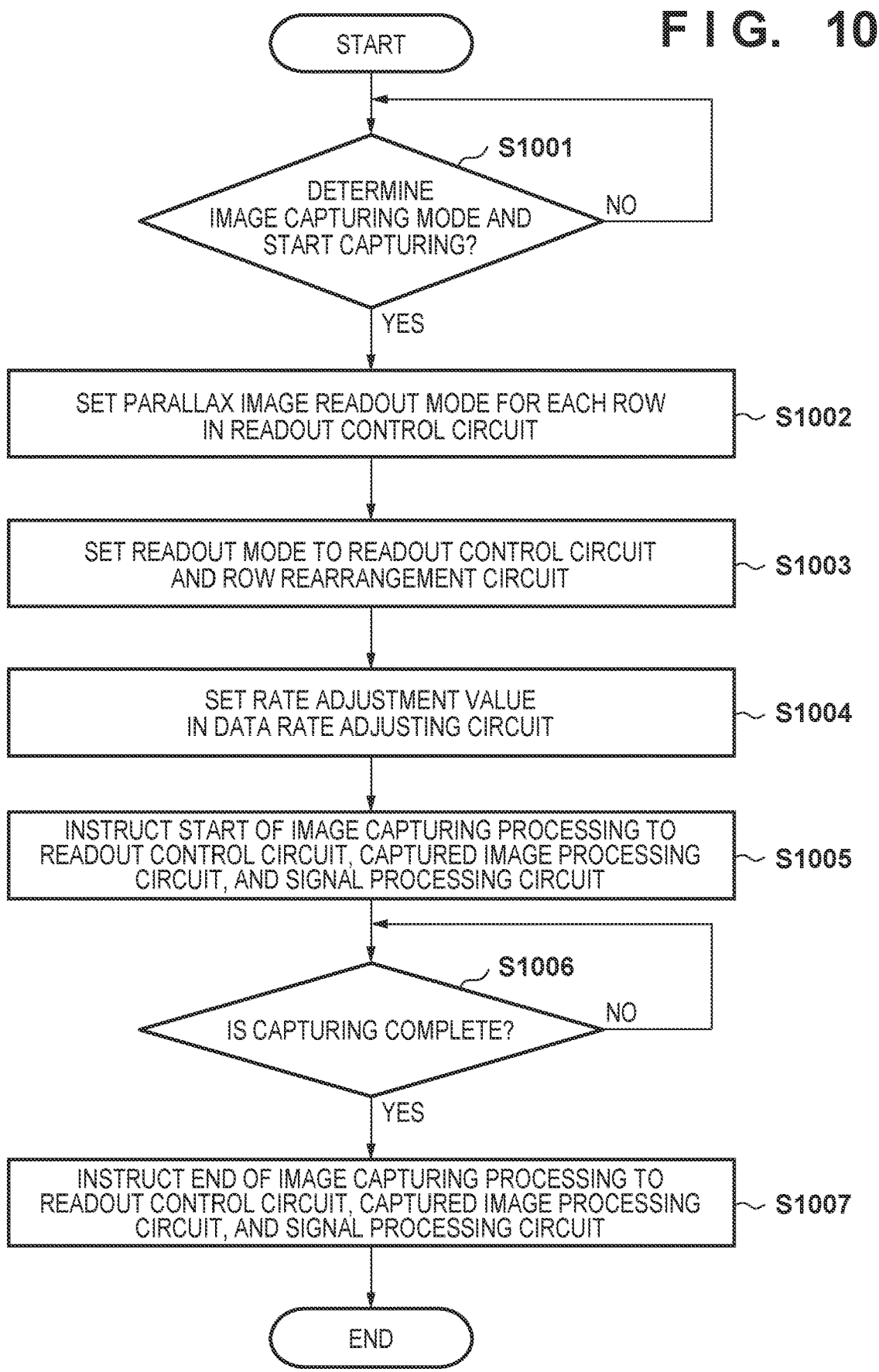
FIG. 10 is a flowchart showing an image data capturing sequence in the second embodiment.

FIG. 10 is a flowchart showing an image data capturing sequence in the present embodiment. In step S1001, the CPU 204 determines whether or not an image capturing mode is set by a user and an instruction to start image capturing is issued. If an instruction to start image capturing is issued, the routine proceeds to step S1002, and otherwise the CPU waits in that state.

In step S1002, a parallax image readout mode is set with respect to each row in the readout control circuit 207. Rows from which only the A+B image is read and rows from which both the A image and the A+B image are read are determined by the parallax image readout mode. In the present embodiment, if a period during which the row rearrangement circuit 2401 consecutively outputs data regarding the A+B image corresponds to six or more rows, the A image is selected to be read from a row that is read right after the period. In step S1003, the CPU 204 sets a readout mode that specifies the number of rows from which data is simultaneously read and the like in the readout control circuit 207 and the row rearrangement circuit 2401. In step S1004, the CPU 204 sets a data rate adjustment value in the data rate adjusting circuit 2403 based on the image capturing mode set by the user. In step S1005, the CPU 204 instructs the readout control circuit 207, the captured image processing circuit 250, and the signal processing circuit 210 to start image capturing processing. In step S1006, the CPU 204 determines whether or not the image capturing processing is complete. If the image capturing processing is complete, the routine proceeds to step S1007 and the CPU 204 instructs the readout control circuit 207, the captured image processing circuit 250, and the signal processing circuit 210 to end the image capturing processing.

As described above, if the length of invalid data periods (blanking) is varied between rows through the control performed in the present embodiment, the peak rate of a captured image can be controlled so as not to take up the memory bus bandwidth, and data can be processed at a high speed. In the control performed in the present embodiment, control for reducing the amount of information regarding captured image data is not performed for the purpose of reducing the memory bus bandwidth, and therefore the quality of a recorded image is not degraded.

In the present embodiment, the length of invalid data periods (blanking) is varied between rows by changing the parallax image readout mode between rows, but another means may also be used to vary the length of invalid data periods (blanking) between rows. For example, in a mode in which only the A+B image is read from all rows, the length of invalid data periods may also be varied between rows through control performed by the readout control circuit 207. At this time, control may also be performed to increase the length of an invalid data period if a period during which the row rearrangement circuit 2401 consecutively outputs data regarding the A+B image is at least a predetermined period (for example, six or more rows).

In the present embodiment, the pattern 2 of four-row simultaneous reading is described as the readout mode, but another readout mode may also be employed. Also, the data rate adjustment value set in the data rate adjusting circuit 2403 may also be varied from that in the present embodiment.

The data rate adjusting circuit 2403 in the present embodiment is configured to output "STOP" from the STOP generation circuit 24033 based on values counted by the input VAL counter 24031 and the CYCLE counter 24032, but another configuration may also be employed so long as the data rate can be adjusted.

In the present embodiment, the DRAM is used as the memory, but a memory other than the DRAM may also be used.

Third Embodiment

The following describes a third embodiment of the present invention. Configurations of the image capturing device and the data rate adjusting circuit in the third embodiment are similar to those in the first embodiment, and the configuration of the image sensor is similar to that in the second embodiment shown in FIGS. 6A and 6B, and therefore descriptions thereof are omitted. The present embodiment differs from the first and second embodiments in data readout control performed by the readout control circuit 207, the configuration of the captured image processing circuit, and the image data capturing sequence.

Figure 11:
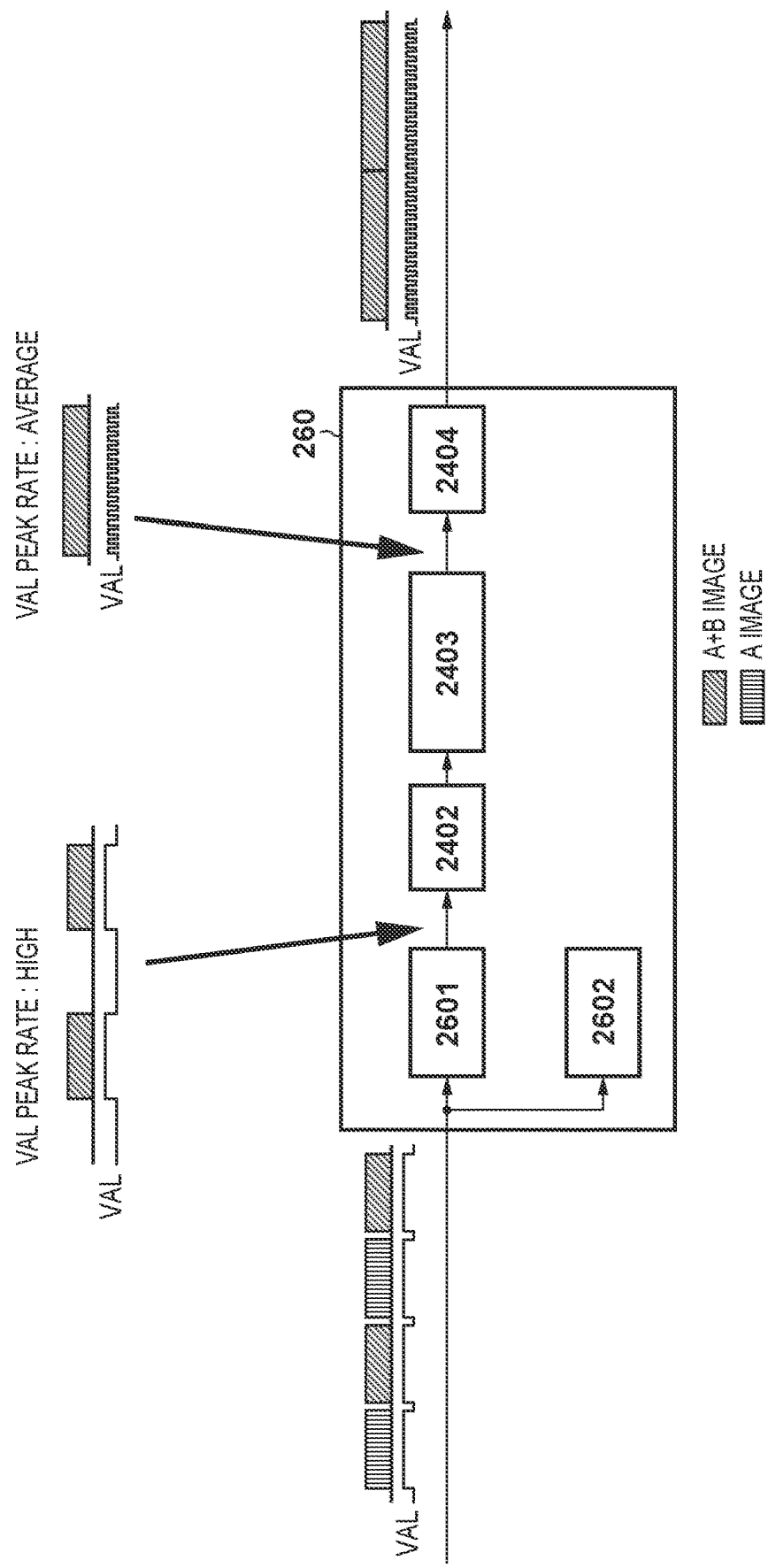
FIG. 11 is a block diagram showing a configuration of a captured image processing circuit in a third embodiment.

FIG. 11 is a diagram showing a configuration of a captured image processing circuit 260 in the present embodiment. FIG. 11 shows a case in which the A image and the A+B image are read from the image sensor 202. Input data includes valid periods during which valid data (hereinafter denoted with "VAL") is input and invalid data periods (blanking) during which valid data is not input. A parallax image processing circuit 2602 performs correlation operation processing using a known method to drive a focus lens. A parallax image separation circuit 2601 separates the input A image and outputs only the A+B image. Therefore, even if data is input to the parallax image separation circuit 2601 at a data rate of 100%, invalid data periods (blanking) are generated in output data as a result of the A image being separated. The data rate adjusting circuit 2403 averages the peak rate of data using the invalid data periods (blanking).

Data can be accumulated in the buffer memory 2402, and the buffer memory 2402 absorbs a local difference between an input data rate and an output data rate. The data rate adjusting circuit 2403 controls the output data rate so as not to exceed a data rate that is set by the CPU 204. If the input rate is higher than a set rate, the data rate adjusting circuit 2403 in the present embodiment outputs a signal (hereinafter denoted with "STOP") for forbidding data input, to the buffer memory 2402. When "STOP" is input, the buffer memory 2402 holds data in an internal buffer, and when "STOP" is canceled, the buffer memory 2402 outputs data that has been held. The sensor correction circuit 2404 performs correction processing such as correction of flaws of pixels of the image sensor 202.

In the present embodiment, the peak rate of valid data is averaged using blanking periods during which valid data is not input. If the peak rate of data is not averaged, a bandwidth of the peak rate is applied to the DRAM 230 during valid data periods, and most of the DRAM bandwidth is used. As a result, access to the DRAM 230 is restricted in other processing during valid data periods, and data processing performance of the entire system is degraded. If access to the DRAM 230 performed in other processing is high-speed processing that will be complete in a blanking period, the performance of the system is not degraded even if the peak rate is not averaged, but if such high-speed processing is realized, cost and power consumption are increased. If the peak rate of data is averaged, the bandwidth of the peak rate applied to the DRAM 230 is reduced, and the DRAM 230 can be accessed in other processing. As a result, it is possible to prevent degradation of the data processing performance of the entire system due to the restriction of access to the DRAM 230 in other processing.

Figure 12B:
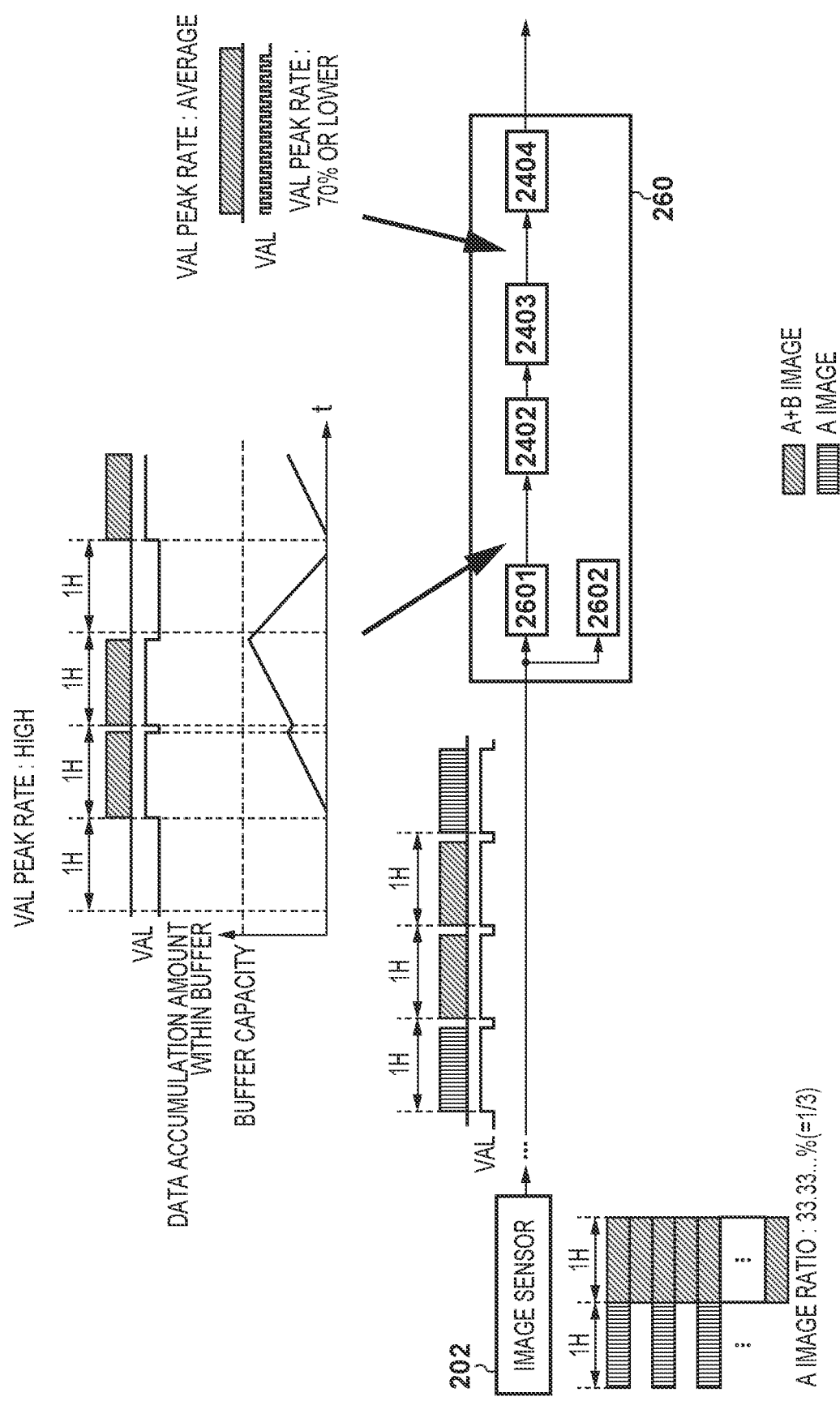
FIG. 12B is a diagram showing data rate adjustment in the third embodiment.
Figure 12C:
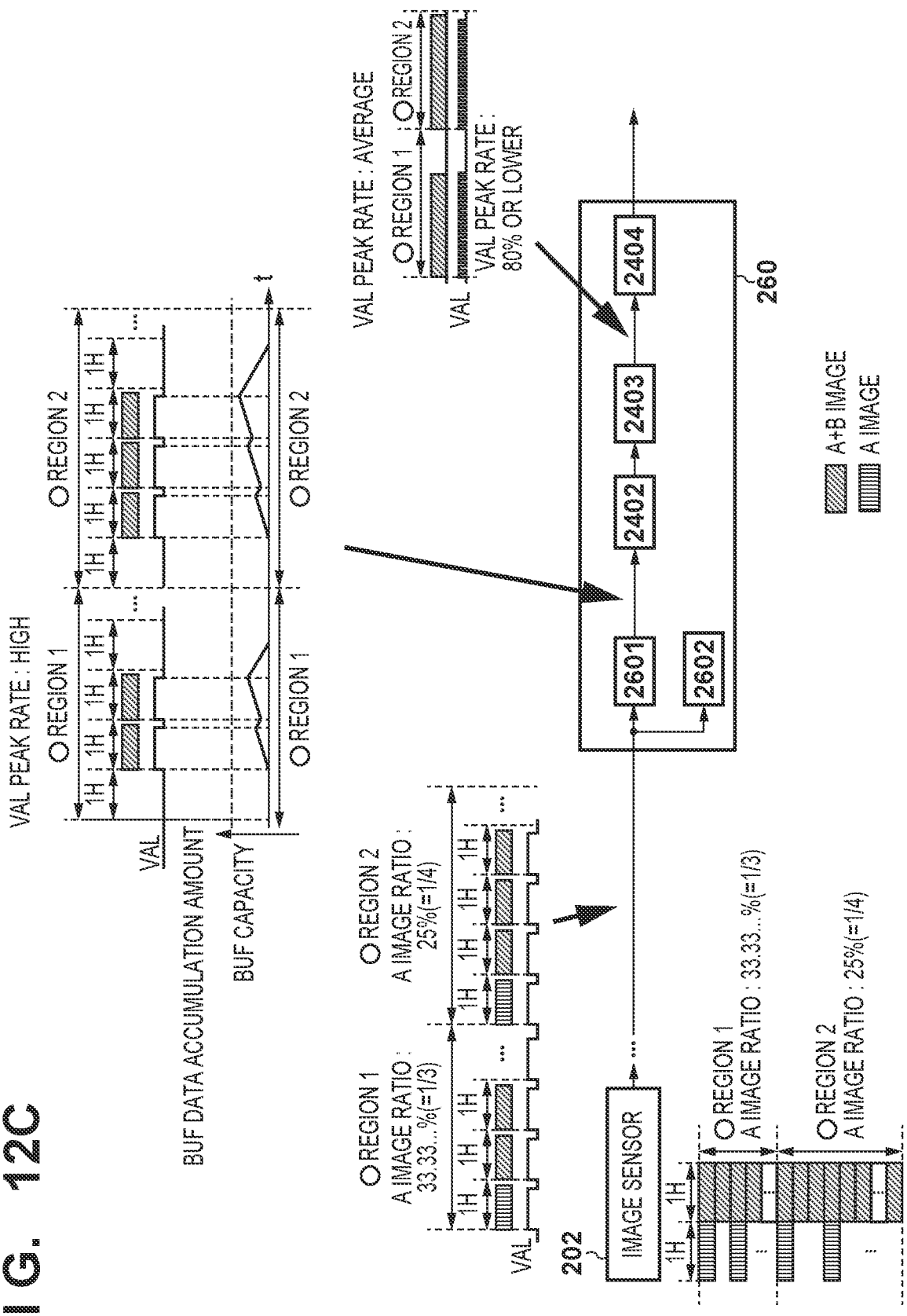
FIG. 12C is a diagram showing data rate adjustment in the third embodiment.

FIGS. 12A to 12C are diagrams showing data rate adjustment in the third embodiment. FIG. 12A shows a case in which both the A image and the A+B image are read from all rows of the image sensor 202. FIG. 12B shows a case in which reading of A image rows of the image sensor is performed at a constant ratio relative to reading of A+B image rows. FIG. 12C shows a case in which the ratio of reading of A image rows relative to reading of A+B image rows varies between regions.

Data rate adjustment in the case in which both the A image and the A+B image are read from all rows of the image sensor 202, which is shown in FIG. 12A, will be described. The A image and the A+B image are alternately input to the captured image processing circuit 260 starting from the first row, and there are valid data periods during which data is input and invalid data periods during which data is not input. In the present embodiment, the volume of read data regarding the A image is 80% of the volume of read data regarding the A+B image. The parallax image separation circuit 2601 separates the input A image and outputs only the A+B image. Therefore, invalid data periods (blanking) are generated in data output from the parallax image separation circuit 2601 as a result of the A image being separated. The data rate adjusting circuit 2403 averages the peak rate of data using the invalid data periods. The longer the invalid data periods are, the more the peak rate of data can be reduced. In the present embodiment, the data rate adjustment value is set such that the data rate becomes 60% or lower. The buffer memory 2402 holds data corresponding to "STOP" output from the data rate adjusting circuit 2403 during valid data periods, and outputs the held data during invalid data periods. The parallax image separation circuit 2601 outputs data regarding the A+B image in the first row at a data rate of 100% and the data rate set in the data rate adjusting circuit is 60%, and therefore data with a volume that corresponds to a single row×about 40% accumulates in the buffer memory 2402 during processing of the first row. The accumulated data is output during an invalid data period. If the output data rate is set to a value that is too low, "STOP" output from the data rate adjusting circuit 2403 is increased, and the volume of data to be held by the buffer memory 2402 exceeds the data capacity of the buffer memory 2402. Therefore, a data rate with which overflowing does not occur at the buffer memory 2402 is set in the present embodiment.

Data rate adjustment in the case in which reading of A image rows is performed at a constant ratio relative to reading of A+B image rows, which is shown in FIG. 12B, will be described. Data is sequentially input from the image sensor 202 to the captured image processing circuit 260 starting from the first row, and there are valid data periods during which data is input and invalid data periods during which data is not input. In the present embodiment, the volume of data read from a single row is the same between the A image and the A+B image, but data regarding the A image in a single row is read while data regarding the A+B image in two rows is read. That is, the ratio of the volume of data regarding the A image relative to the whole volume of read data is 33.33% (=⅓). The parallax image separation circuit 2601 separates the input A image and outputs only the A+B image. Therefore, invalid data periods (blanking) are generated in data output from the parallax image separation circuit 2601 as a result of the A image being separated. The data rate adjusting circuit 2403 averages the peak rate of data using the invalid data periods. The longer the invalid data periods are, the more the data rate can be reduced, but if valid data periods are long as is the case with this example, data needs to be accumulated in the buffer memory 2402 during the valid data periods, and therefore it is difficult to reduce the data rate.

In the present embodiment, the A+B image is consecutively read from two rows, and during this period, data needs to be accumulated in the buffer memory 2402. In the present embodiment, the data rate adjustment value is set such that the data rate becomes 70% or lower. The buffer memory 2402 holds data corresponding to "STOP" output from the data rate adjusting circuit 2403 during valid data periods, and outputs the held data during invalid data periods. The parallax image separation circuit 2601 outputs data regarding the A+B image in the first and second rows at a data rate of 100% and the data rate set in the data rate adjusting circuit is 70%, and therefore data with a volume that corresponds to about 60% of a single row (=30%×two rows) accumulates in the buffer memory 2402 during processing of the first and second rows. The accumulated data is output during an invalid data period. If the output data rate is set to a value that is too low, "STOP" output from the data rate adjusting circuit 2403 is increased, and the volume of data to be held by the buffer memory 2402 exceeds the data capacity of the buffer memory 2402. Therefore, a data rate with which overflowing does not occur at the buffer memory 2402 is set in the present embodiment.

Data rate adjustment in the case in which the ratio of reading of A image rows relative to reading of A+B image rows varies between regions, which is shown in FIG. 12C, will be described. Data is sequentially input from the image sensor 202 to the captured image processing circuit 260 starting from the first row, and there are valid data periods during which data is input and invalid data periods during which data is not input. In the present embodiment, the volume of data read from a single row is the same between the A image and the A+B image, but the ratio of reading of the A image relative to reading of the A+B image varies between two regions. In a region 1, data regarding the A image in a single row is read while data regarding the A+B image in two rows is read. That is, the ratio of the volume of data regarding the A image relative to the whole volume of read data is 33.33% (=⅓). In a region 2, data regarding the A image in a single row is read while data regarding the A+B image in three rows is read. That is, the ratio of the volume of data regarding the A image relative to the whole volume of read data is 25% (=¼). The parallax image separation circuit 2601 separates the input A image and outputs only the A+B image. Therefore, invalid data periods (blanking) are generated in data output from the parallax image separation circuit 2601 as a result of the A image being separated. The data rate adjusting circuit 2403 averages the peak rate of data using the invalid data periods. The longer the invalid data periods are, the more the data rate can be reduced, but if valid data periods are long as is the case with this example, data needs to be accumulated in the buffer memory 2402 during the valid data periods, and therefore it is difficult to reduce the data rate. In the present embodiment, the A+B image is consecutively read from two rows in the region 1, and consecutively read from three rows in the region 2. Therefore, a data rate with which data can be accumulated in the buffer memory 2402 under the worse condition, i.e., while the A+B image is consecutively read from three rows, needs to be set in the data rate adjusting circuit 2403.

In the present embodiment, the data rate adjustment value is set such that the data rate becomes 80% or lower. The buffer memory 2402 holds data corresponding to "STOP" output from the data rate adjusting circuit 2403 during valid data periods, and outputs the held data during invalid data periods. In the region 1, the parallax image separation circuit 2601 outputs data regarding the A+B image in the first and second rows at a data rate of 100% and the data rate set in the data rate adjusting circuit is 80%. Therefore, data with a volume that corresponds to about 40% of a single row (=20%×two rows) accumulates in the buffer memory 2402 during processing of the first and second rows. The accumulated data is output during an invalid data period. In the region 2, the parallax image separation circuit 2601 outputs data regarding the A+B image in the first, second, and third rows at a data rate of 100% and the data rate set in the data rate adjusting circuit is 80%. Therefore, data that corresponds to about 60% (=20%×three rows) accumulates in the buffer memory 2402 during processing of the first, second, and third rows. The accumulated data is output during an invalid data period. If the output data rate is set to a value that is too low, "STOP" output from the data rate adjusting circuit 2403 is increased, and the volume of data to be held by the buffer memory 2402 exceeds the data capacity of the buffer memory 2402. Therefore, a data rate with which overflowing does not occur at the buffer memory 2402 is set in the present embodiment.

Figure 13:
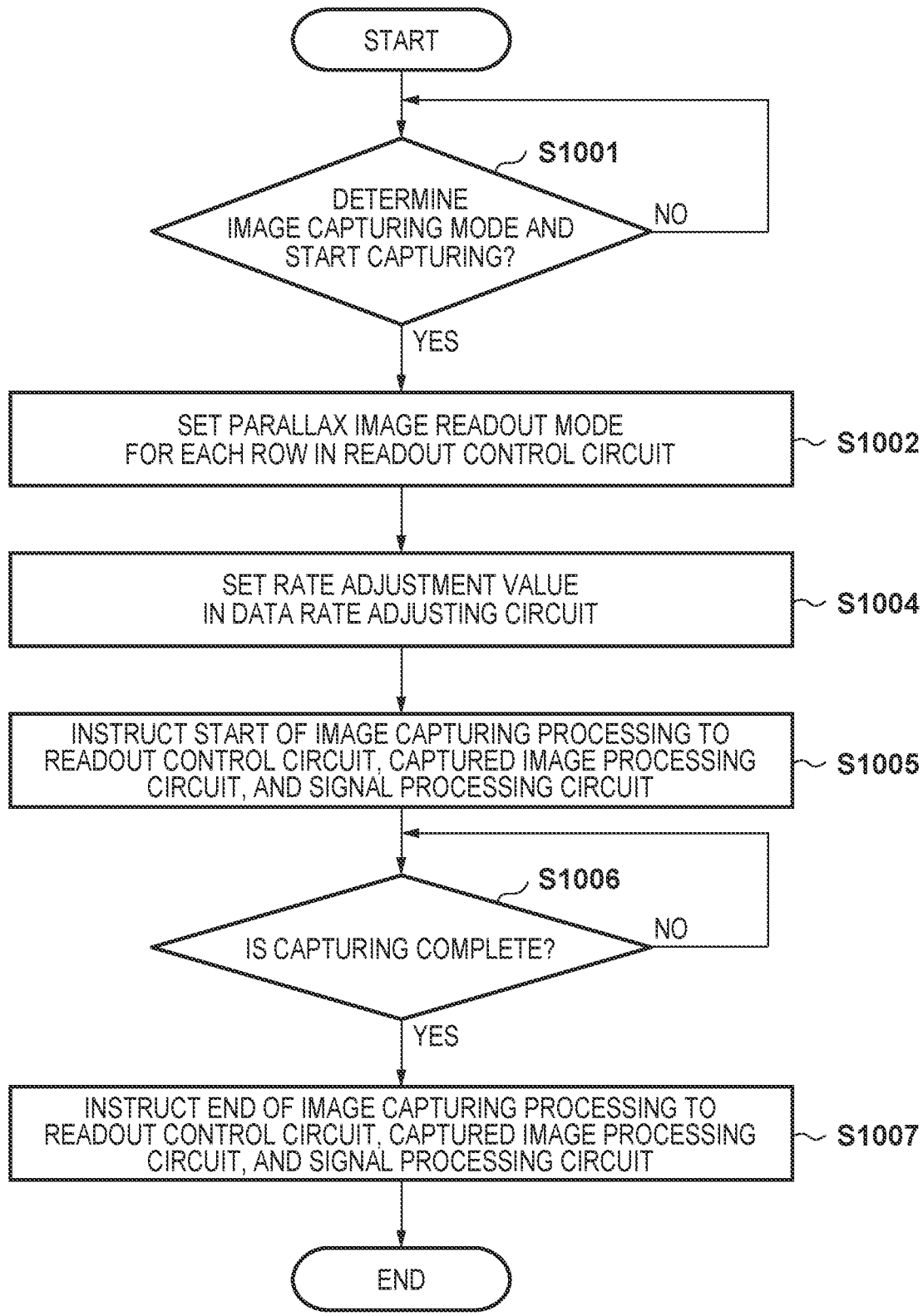
FIG. 13 is a flowchart showing an image data capturing sequence in the third embodiment.

FIG. 13 is a flowchart showing an image data capturing sequence in the present embodiment.

In step S1001 of FIG. 13, the CPU 204 determines whether or not an image capturing mode is set by a user and an instruction to start image capturing is issued. If an instruction to start image capturing is issued, the routine proceeds to step S1002, and otherwise the CPU waits in that state.

In step S1002, a parallax image readout mode is set with respect to each row in the readout control circuit 207. Arrangement regarding reading of a parallax image and the volume of data to be read are determined by the parallax image readout mode. In step S1004, the CPU 204 sets a data rate adjustment value in the data rate adjusting circuit 2403 based on the image capturing mode set by the user.

In step S1005, the CPU 204 instructs the readout control circuit 207, the captured image processing circuit 260, and the signal processing circuit 210 to start image capturing processing. In step S1006, the CPU 204 determines whether or not the image capturing processing is complete. If the image capturing processing is complete, the routine proceeds to step S1007, and otherwise the CPU waits for completion of the image capturing processing. In step S1007, the CPU 204 instructs the readout control circuit 207, the captured image processing circuit 260, and the signal processing circuit 210 to end the image capturing processing.

As described above, according to the present embodiment, the peak rate of a captured image is controlled so as not to take up the memory bus bandwidth, and therefore data can be processed at a high speed. In the control performed in the present embodiment, control for reducing the amount of information regarding captured image data is not performed for the purpose of reducing the memory bus bandwidth, and therefore the quality of a recorded image is not degraded.

Note that the arrangement regarding reading of the parallax image and the volume of data to be read may also be varied from those in the present embodiment. Also, the data rate adjustment value set in the data rate adjusting circuit 2403 may also be varied from those in the present embodiment.

The data rate adjusting circuit 2403 in the present embodiment is configured to output "STOP" from the STOP generation circuit 24033 based on values counted by the input VAL counter 24031 and the CYCLE counter 24032, but another configuration may also be employed so long as the data rate can be adjusted. In the present embodiment, the DRAM is used as the memory, but a memory other than the DRAM may also be used.

Fourth Embodiment

The following describes a fourth embodiment of the present invention. Configurations of the image capturing device, the image sensor, and the captured image processing circuit in the present embodiment are similar to those in the third embodiment, and therefore descriptions thereof are omitted. The present embodiment differs from the third embodiment in the configuration of the data rate adjusting circuit and the image data capturing sequence. The present embodiment differs from the third embodiment in that the data rate is adjusted to different rates for data regarding a plurality of regions of a single plane of an image read from the image sensor.

Figure 14:
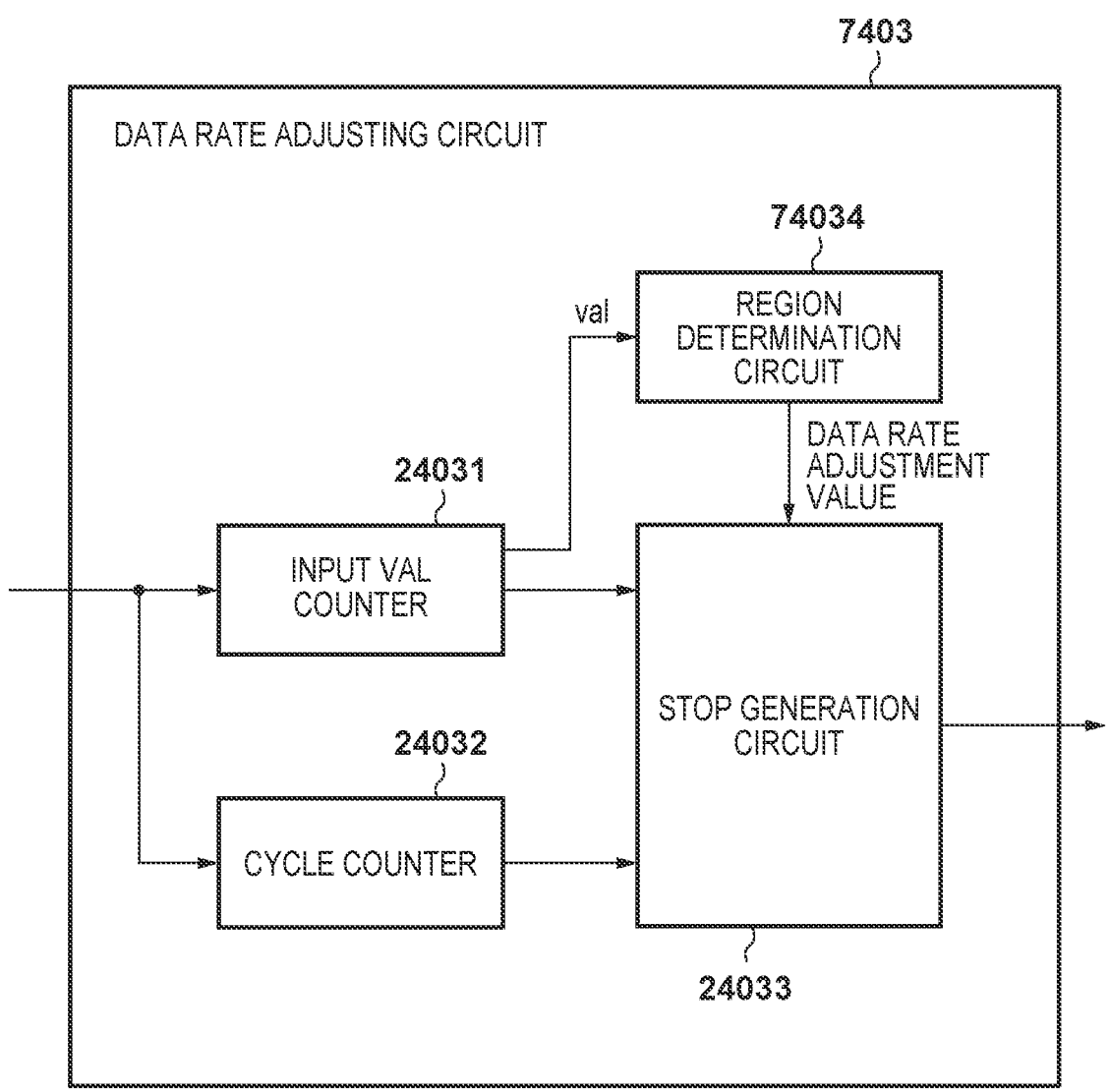
FIG. 14 is a block diagram showing a configuration of a data rate adjusting circuit in a fourth embodiment.

FIG. 14 is a diagram showing a configuration of a data rate adjusting circuit 7403 in the present embodiment. The input VAL counter 24031, the CYCLE counter 24032, and the STOP generation circuit 24033 are the same as those in the first embodiment, and therefore descriptions thereof are omitted. In the present embodiment, the data rate is adjusted to different rates for data regarding two regions (a region 1 and a region 2) of a single plane of an image. A region determination circuit 74034 counts VALs output from the input VAL counter 24031, and compares the VAL counter value with a region boundary value that is set by the CPU 204, to determine which of data regarding the region 1 and data regarding the region 2 is currently processed. In the region determination circuit 74034, data rate adjustment values are respectively set for the region 1 and the region 2 by the CPU 204, and the region determination circuit 74034 outputs a data rate adjustment value that is selected according to a result of region determination to the STOP generation circuit 24033. The STOP generation circuit 24033 controls the data rate based on the data rate adjustment value input from the region determination circuit 74034.

Figure 15:
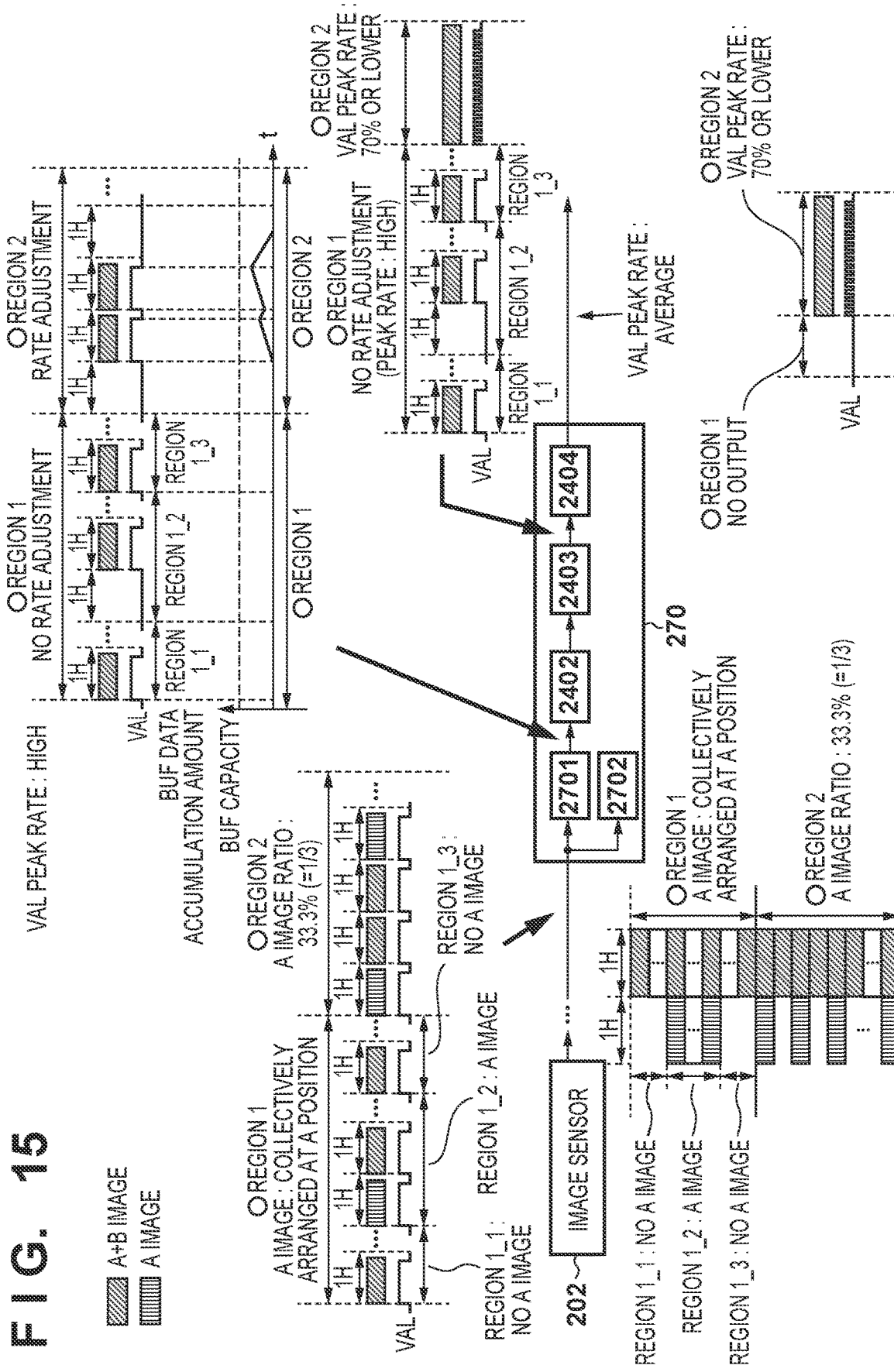
FIG. 15 is a diagram showing data rate adjustment in the fourth embodiment.

FIG. 15 is a diagram showing data rate adjustment in the fourth embodiment of the present invention. In an image output from the image sensor 202, positions and the ratio of A image rows differ between the region 1 and the region 2 of the image sensor 202. A image rows in the region 1 of the present embodiment are collectively arranged at a position with respect to A+B image rows. The region 1 includes regions 1_1 and 1_3 that do not include A image rows and a region 1_2 that includes A image rows. The A+B image in the region 1 is data that is used by the sensor correction circuit 2404 and is not used for purposes other than sensor correction, and therefore is not written into the DRAM 230. A image rows in the region 2 of the present embodiment are arranged at constant intervals with respect to A+B image rows. The A+B image in the region 2 (data regarding some of the regions) is data that is used by the signal processing circuit 210 and is written into the DRAM 230.

Data is sequentially input from the image sensor 202 to the captured image processing circuit 270 starting from the first row, and there are valid data periods during which data is input and invalid data periods during which data is not input. A parallax image separation circuit 2701 separates the input A image and outputs only the A+B image. As a result, invalid data periods (blanking) are generated in data output from the parallax image separation circuit 2701 as a result of the A image being separated.

The data rate adjusting circuit 2403 averages the peak rate of data using the invalid data periods. In the present embodiment, the data rate adjusting circuit 2403 can set data rates of different values respectively for the region 1 and the region 2. In the present embodiment, data regarding the region 1 is not written into the DRAM 230, and even if the data rate of the region 1 is high, the memory bus bandwidth is not taken up, and therefore data rate adjustment is not performed in the region 1. In the region 2, invalid data periods are generated as a result of the A image being separated, and therefore the data rate is averaged using the invalid data periods. In the present embodiment, the data rate adjustment value is set such that the peak rate of data regarding the region 2 becomes 70% or lower. If the output data rate is set to a value that is too low, "STOP" output from the data rate adjusting circuit 2403 is increased, and the volume of data to be held by the buffer memory 2402 exceeds the data capacity of the buffer memory 2402. Therefore, a data rate with which overflowing does not occur at the buffer memory 2402 is set in the present embodiment.

With the above-described control performed in the present embodiment, the data rate is controlled to different rates for different regions, and therefore the peak rate of data written into the DRAM can be further averaged. If the data rate cannot be controlled to a plurality of rates as is the case with the third embodiment, rate adjustment needs to be performed such that overflowing of data from the buffer memory 2402 does not occur in a region that has the highest peak rate in a single plane. The peak rate of data input to the data rate adjusting circuit 2403 is the highest in the regions 1_1 and 1_3. In the present embodiment, if the data rate is 95%, overflowing of data from the buffer memory 2402 does not occur in the regions 1_1 and 1_3. In this case, the data rate of the region 2 needs to be controlled to the same rate as that in the regions 1_1 and 1_3, i.e., 95%. With the control performed in the present embodiment rather than the control performed in the third embodiment, the peak rate of data written into the DRAM can be reduced to 70%. If the data rate is controlled to different rates for different regions as in the present embodiment, the peak rate of data written into the DRAM can be further reduced.

Figure 16:
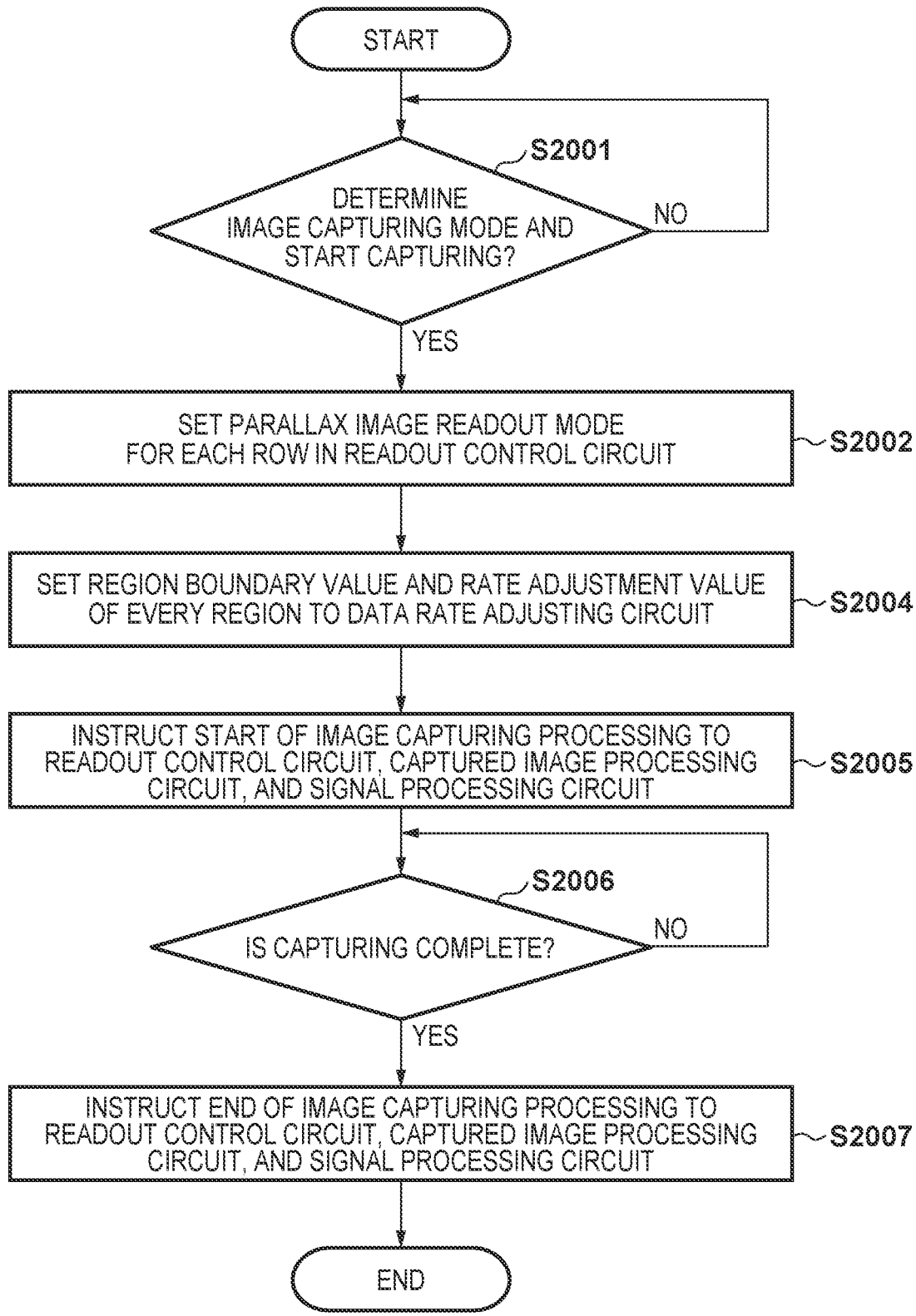
FIG. 16 is a flowchart showing an image data capturing sequence in the fourth embodiment.

FIG. 16 is a flowchart showing an image data capturing sequence in the present embodiment. In step S2001 of FIG. 16, the CPU 204 determines whether or not an image capturing mode is set by a user and an instruction to start image capturing is issued. If an instruction to start image capturing is issued, the routine proceeds to step S2002, and otherwise the CPU waits in that state.

In step S2002, a parallax image readout mode is set with respect to each row in the readout control circuit 207. Arrangement regarding reading of the A image and the volume of data to be read are determined by the parallax image readout mode. In step S2004, the CPU 204 sets a region boundary value and a data rate adjustment value for each region in the data rate adjusting circuit 2403 based on the image capturing mode set by the user.

In step S2005, the CPU 204 instructs the readout control circuit 207, the captured image processing circuit 270, and the signal processing circuit 210 to start image capturing processing. In step S2006, the CPU 204 determines whether or not the image capturing processing is complete. If the image capturing processing is complete, the routine proceeds to step S2007, and otherwise the CPU waits for completion of the image capturing processing. In step S2007, the CPU 204 instructs the readout control circuit 207, the captured image processing circuit 270, and the signal processing circuit 210 to end the image capturing processing.

As described above, according to the above-described embodiment, different data rates can be set for different regions, the peak rate of a captured image can be controlled so as not to take up the memory bus bandwidth, and data can be processed at a high speed. In the control performed in the present embodiment, control for reducing the amount of information regarding captured image data is not performed for the purpose of reducing the memory bus bandwidth, and therefore the quality of a recorded image is not degraded.

In the present embodiment, different data rates are set for two regions in a single plane, but a configuration is also possible in which different data rates are set for three or more regions. In the present embodiment, A image rows are collectively arranged at a position in the region 1, but a configuration is also possible in which A image rows are arranged at constant intervals. In this case, even if A image rows are arranged at constant intervals, if the order of reading performed by the readout control circuit 207 is such that the A image rows are collected at a position, control is performed in the same manner as that performed in the present embodiment in which A image rows are collectively arranged at a position. For example, even if A image rows are arranged at constant intervals by arranging the A image and the A+B image at odd number rows of the image sensor and arranging the A+B image at even number rows, if reading is first performed from only the odd number rows of the image sensor and thereafter from the even number rows, the captured image processing circuit 270 performs the same control as that performed in a case in which the A image is collectively arranged in a region.

In the present embodiment, A image rows are arranged at constant intervals in the region 2, but a configuration is also possible in which A image rows are collectively arranged at a position. In the present embodiment, data regarding one of the two regions is not written into the DRAM, but the present invention can also be applied to a system in which the data is written into the DRAM. Also, the rate adjustment values set in the data rate adjusting circuit 2403 may also be varied from those in the present embodiment.

The data rate adjusting circuit 2403 in the present embodiment is configured to output "STOP" from the STOP generation circuit 24033 based on values counted by the input VAL counter 24031 and the CYCLE counter 24032, but another configuration may also be employed so long as the data rate can be adjusted. In the present embodiment, the DRAM is used as the memory, but a memory other than the DRAM may also be used.

According to the present invention, in a case in which a captured image data rate is high, data can be processed at a high speed without degrading image quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device comprising:
 a buffer memory configured to temporarily store image data that is read from an image sensor at a data rate whose density varies;
 a setting circuit configured to set a first data rate at which the image data is transferred to a recording memory for recording the image data, according to variation in the density of the data rate; and
 an adjusting circuit configured to adjust a data rate by causing a portion of image data read from the image sensor to be temporarily stored in the buffer memory when a second data rate exceeds the first data rate, and causing the temporarily stored portion of the image data to be output from the buffer memory when the second data rate is lower than the first data rate, the second data rate being a data rate at which the image data is read from the image sensor, the portion of the image data corresponding to an amount by which the second data rate exceeds the first data rate.

2. The image processing device according to claim 1, further comprising
 a readout control circuit configured to read image data regarding a plurality of rows of the image sensor simultaneously.

3. The image processing device according to claim 2, wherein
 the setting circuit sets the first data rate according to the number and positions of rows of the image sensor from which image data is simultaneously read.

4. The image processing device according to claim 1, further comprising
 a rearrangement circuit configured to rearrange image data pieces regarding a plurality of rows read from the image sensor, in the order of the rows.

5. The image processing device according to claim 4, wherein
 if image data read from the image sensor is image data regarding a single row, the rearrangement circuit does not rearrange image data.

6. The image processing device according to claim 1, wherein
 the image data includes a valid data period that includes data and an invalid data period that does not include data, and the adjusting circuit causes image data temporarily stored in the buffer memory to be output from the buffer memory during the invalid data period.

7. The image processing device according to claim 1, wherein
 the image sensor is capable of outputting a plurality of types of image data from each row, and the image processing device further includes a separation circuit configured to separate image data output from the image sensor according to the type of the image data.

8. The image processing device according to claim 7, wherein
 the adjusting circuit adjusts a data rate with respect to image data separated by the separation circuit.

9. The image processing device according to claim 7, wherein
 the plurality of types of image data are image data pieces that have parallax and are obtained by dividing a light flux that passes through a pupil of an image capturing optical system into two or more.

10. The image processing device according to claim 7, wherein
 the image processing device further includes a readout control circuit configured to set a type of image data to be read and the number of types, for each row of the image sensor, and if a period during which the rearrangement circuit consecutively outputs image data of a first type is equal to or longer than a predetermined length, the readout control circuit selects image data of a type different from the first type as data to be read right after the period.

11. The image processing device according to claim 10, wherein
 the readout control circuit is capable of controlling, with respect to each row, a period from when reading of one or more rows is started to when reading of one or more rows is started next.

12. The image processing device according to claim 1, wherein
 with respect to image data that is read from a plurality of regions of the image sensor, the adjusting circuit adjusts data rates of the respective regions to different values.

13. The image processing device according to claim 1, wherein
 out of image data regarding a plurality of regions of an image read from the image sensor, only data regarding some of the regions is recorded in the recording memory.

14. A method for controlling an image processing device that includes a buffer memory configured to temporarily store image data that is read from an image sensor at a data rate whose density varies, the method comprising:
 setting a first data rate at which the image data is transferred to a recording memory for recording the image data, according to variation in the density of the data rate; and
 adjusting a data rate by temporarily storing a portion of image data read from the image sensor in the buffer memory when a second data rate exceeds the first data rate, and outputting the temporarily stored portion of the image data from the buffer memory when the second data rate is lower than the first data rate, the second data rate being a data rate at which the image data is read from the image sensor, the portion of the image data corresponding to an amount by which the second data rate exceeds the first data rate.

15. A non-transitory computer-readable storage medium in which a program for causing a computer to execute each step of a method for controlling an image processing device that includes a buffer memory configured to temporarily store image data that is read from an image sensor at a data rate whose density varies, the method comprising:
 setting a first data rate at which the image data is transferred to a recording memory for recording the image data, according to variation in the density of the data rate; and
 adjusting a data rate by temporarily storing a portion of image data read from the image sensor in the buffer memory when a second data rate exceeds the first data rate, and outputting the temporarily stored portion of the image data from the buffer memory when the second data rate is lower than the first data rate, the second data rate being a data rate at which the image data is read from the image sensor, the portion of the image data corresponding to an amount by which the second data rate exceeds the first data rate.

* * * * *